(12) United States Patent
Iida et al.

(10) Patent No.: US 10,805,546 B2
(45) Date of Patent: Oct. 13, 2020

(54) IMAGE PROCESSING SYSTEM, IMAGE PROCESSING DEVICE, AND IMAGE PROCESSING PROGRAM

(71) Applicant: OMRON Corporation, Kyoto (JP)

(72) Inventors: Toyoo Iida, Nagaokakyo (JP); Yuki Taniyasu, Ritto (JP)

(73) Assignee: OMRON Corporation, Kyoto (JP)

( * ) Notice: Subject to any disclaimer, the term of this patent is extended or adjusted under 35 U.S.C. 154(b) by 24 days.

(21) Appl. No.: 15/964,033

(22) Filed: Apr. 26, 2018

(65) Prior Publication Data

US 2018/0338090 A1 Nov. 22, 2018

(30) Foreign Application Priority Data

May 17, 2017 (JP) .................. 2017-098361
Mar. 28, 2018 (JP) .................. 2018-061951

(51) Int. Cl.
*H04N 5/232* (2006.01)
*G06T 7/73* (2017.01)
*G06T 7/00* (2017.01)

(52) U.S. Cl.
CPC ....... *H04N 5/23296* (2013.01); *G06T 7/0008* (2013.01); *G06T 7/73* (2017.01);
(Continued)

(58) Field of Classification Search
CPC ..... H04N 5/23296; G06T 7/0008; G06T 7/73; G06T 2207/10028; G06T 2200/04; G06T 2207/10012; G06T 2207/30164
See application file for complete search history.

(56) References Cited

U.S. PATENT DOCUMENTS 5,400,638 A 3/1995 Kim
5,608,847 A 3/1997 Pryor
(Continued)

FOREIGN PATENT DOCUMENTS

CN 101021489 8/2007
CN 101034070 9/2007
(Continued)

OTHER PUBLICATIONS

Office Action of German Counterpart Application, with English translation thereof, dated Oct. 30, 2018, pp. 1-12.
(Continued)

*Primary Examiner* — Joseph G Ustaris
*Assistant Examiner* — Jill D Sechser
(74) *Attorney, Agent, or Firm* — JCIPRNET

(57) ABSTRACT

An image processing system (SYS) specifies an arrangement situation of a workpiece (W) provided by a line (L). The image processing system (SYS) specifies a normal (V) with respect to a set measurement point (Wp) of the workpiece (W) according to the specified arrangement situation of the workpiece (W), and changes a position and posture of the two-dimensional camera (310) so that the specified normal (V) matches an optical axis of the two-dimensional camera (310) (S1). The image processing system (SYS) changes a distance between the two-dimensional camera (310) and the measurement point (Wp) so that the specified normal (V) matches the optical axis of the two-dimensional camera (310), to focus the two-dimensional camera (310) on the measurement point (Wp).

20 Claims, 18 Drawing Sheets

(52) U.S. Cl.
CPC ...... *G06T 2200/04* (2013.01); *G06T 2207/10012* (2013.01); *G06T 2207/10028* (2013.01); *G06T 2207/10088* (2013.01); *G06T 2207/30164* (2013.01); *H04N 5/23299* (2018.08)

(56) References Cited

U.S. PATENT DOCUMENTS

| | | | |
|---|---|---|---|
| 2009/0234502 A1* | 9/2009 | Ueyama | B25J 9/1697 700/259 |
| 2013/0245828 A1 | 9/2013 | Tateno et al. | |
| 2015/0262346 A1* | 9/2015 | Horita | B25J 9/1697 348/137 |
| 2016/0267668 A1 | 9/2016 | Yamada | |

FOREIGN PATENT DOCUMENTS

| | | |
|---|---|---|
| DE | 102005022344 | 11/2006 |
| DE | 102009012590 | 11/2009 |
| DE | 102009020307 | 11/2009 |
| JP | H8-313225 | 11/1996 |
| JP | 2005052926 | 3/2005 |
| JP | 2011136377 | 7/2011 |

OTHER PUBLICATIONS

"Office Action of China Counterpart Application", dated May 26, 2020, with English translation thereof, pp. 1-17.

\* cited by examiner

IMAGE PROCESSING SYSTEM, IMAGE PROCESSING DEVICE, AND IMAGE PROCESSING PROGRAM

CROSS-REFERENCE TO RELATED APPLICATION

This application claims the priority of Japan patent application serial no. 2017-098361, filed on May 17, 2017 and Japan application serial no. 2018-061951, filed on Mar. 28, 2018. The entirety of each of the above-mentioned patent applications is hereby incorporated by reference herein and made a part of this specification.

BACKGROUND

Technical Field

In the field of factory automation (FA), robots that perform a visual inspection on a workpiece for checking whether parts are correctly assembled or are not damaged are spreading. In such robots, position data of a measurement point indicating a position and a posture of the robot at the time of inspection is taught and stored in advance.

Description of Related Art

For example, as a method of teaching and storing position data of a measurement point in a robot, Japanese Laid-open Patent Application No. 2005-052926 (Patent Document 1) discloses a technology for "obtaining a position of a virtual camera with respect to a virtual workpiece in a three-dimensional CAD system" (see paragraph [0009]).

Further, regarding a technology for performing an accurate visual inspection, for example, Japanese Laid-open Patent Application No. H8-313225 (Patent Document 2) discloses a visual inspection device that "determines a camera position suitable for image processing by moving a camera around an inspection place and measuring a change in a feature amount such as brightness or a shape of an image" (see paragraph [0014]).

RELATED ART DOCUMENTS

Patent Documents

[Patent Document 1] Japanese Laid-open Patent Application No. 2005-052926
[Patent Document 2] Japanese Laid-open Patent Application No. H8-313225

However, in the devices of Patent Document 1 and Patent Document 2, generation of a position deviation when a workpiece is installed or a control error of the robot is not considered.

There is concern that a relative positional relationship between the robot and the workpiece when the robot is actually moved to the measurement point may be different from a relative positional relationship between the robot and the workpiece stored in the robot due to the generation of the position deviation when the workpiece is installed or the error when the robot is controlled. As a result, a camera that is an imaging unit may not be focused on an inspection place. When the imaging unit is not focused on the inspection place, there is concern that accuracy of the inspection may deteriorate.

There is a method in which a user adjusts a position of a robot using a teaching pendant so that each inspection place is focused on, but there is a problem in that the number of manipulation steps performed by the user increases as the number of inspection places increases.

Further, there is a method of focusing the imaging unit using an autofocus function, but there is a problem in that when the autofocus function is used, an optical size is changed with a change in a focal length of the imaging unit.

Therefore, there is a demand for a technology for arranging an imaging unit at an appropriate position with respect to measurement points set in a workpiece and performing appropriate imaging.

SUMMARY

According to an embodiment, an image processing system for performing image measurement for one or a plurality of measurement points preset in a workpiece using an appearance image of the workpiece includes a first imaging unit configured to capture the appearance image; a robot that changes a relative positional relationship between the first imaging unit and the workpiece; a reference line specifying part configured to specify an arrangement situation of the workpiece based on information obtained by imaging the workpiece and specify a reference line with respect to each measurement point set in the workpiece according to the specified arrangement situation of the workpiece; a distance adjustment part configured to position the first imaging unit on the specified reference line and give a command to the robot so that a distance between the first imaging unit and the workpiece is changed in a state in which an optical axis of the first imaging unit is matched with the specified reference line; a first feature amount calculation part configured to calculate a first feature amount regarding a degree of focusing of the first imaging unit based on the appearance image captured by the first imaging unit; and a distance determination part configured to determine the distance between the first imaging unit and the workpiece for performing image measurement for the measurement point based on a change in the first feature amount according to a change in the distance between the first imaging unit and the workpiece.

According to an embodiment, the image processing system further includes: a second imaging unit that is arranged to include at least a portion of the workpiece and the robot in a range of a field of view and captures a three-dimensional image of a subject present within the range of a field of view; and a storage part configured to store information defining a reference line direction associated with each of the one or plurality of measurement points, wherein the reference line specifying part includes a first search part configured to search for a portion matching shape information of the workpiece in the three-dimensional image; and a reference line determination part configured to determine a reference line with respect to each measurement point based on information on the portion searched for by the first search part and the information defining the reference line direction stored in the storage part.

According to an embodiment, the reference line specifying part further includes: a second search part configured to search for a portion matching a reference image of a corresponding measurement point for an image captured by the first imaging unit in a state in which the first imaging unit is positioned on the reference line determined by the reference line determination part; and a correction part configured to correct the reference line determined by the reference line determination part based on the information on the portion searched for by the second search part.

According to an embodiment, the image processing system includes: a position adjustment part configured to give a command to the robot so that an angle between the specified reference line and the optical axis of the first imaging unit is changed from 0 to a predetermined value in a state in which the distance between the first imaging unit and the workpiece is maintained; and a position determination part configured to determine a relative positional relationship between the first imaging unit and the workpiece for performing image measurement for the measurement point based on a change in the first feature amount according to the change in the angle.

According to an embodiment, the image processing system further includes: a second feature amount calculation part configured to calculate a second feature amount regarding a preset detection target portion based on the appearance image captured by the first imaging unit; and an image measurement part configured to determine presence or absence of the detection target portion at a measurement point serving as a target or near the measurement point based on the second feature amount calculated in a state in which the first imaging unit and the workpiece are positioned with a distance therebetween determined by the distance determination part.

According to an embodiment, the reference line specifying part gives a command to the robot to position the first imaging unit at the next measurement point when determination of the presence or absence of the detection target portion performed by the image measurement part is completed.

According to an embodiment, the image processing system further includes a measurement point setting reception part configured to display design information of the workpiece and set the one or plurality of measurement points according to a user operation with respect to the displayed design information.

According to an embodiment, the image processing system further includes a reference line calculation part configured to calculate a surface shape of each measurement point based on the design information of the workpiece for each of the measurement points set by the measurement point setting reception part, and calculate a reference line of each measurement point based on the calculated surface shape.

According to another embodiment, an image processing device for performing image measurement for one or a plurality of measurement points preset in a workpiece using an appearance image of the workpiece includes an interface that receives information on an appearance image from a first imaging unit that captures the appearance image; an interface for communicating with a robot that changes a relative positional relationship between the workpiece and the first imaging unit; a reference line specifying part configured to specify an arrangement situation of the workpiece based on information obtained by imaging the workpiece and specify a reference line with respect to each measurement point set in the workpiece according to the specified arrangement situation of the workpiece; a distance adjustment part configured to position the first imaging unit on the specified reference line and give a command to the robot so that a distance between the first imaging unit and the workpiece is changed in a state in which an optical axis of the first imaging unit is matched with the specified reference line; a first feature amount calculation part configured to calculate a first feature amount regarding a degree of focusing of the first imaging unit based on the appearance image captured by the first imaging unit; and a distance determination part configured to determine the distance between the first imaging unit and the workpiece for performing image measurement for the measurement point based on a change in the first feature amount according to a change in the distance between the first imaging unit and the workpiece.

According to another embodiment, an image processing program for performing image measurement for one or a plurality of measurement points preset in a workpiece using an appearance image of the workpiece causes a computer to execute: a step of imaging the workpiece using a first imaging unit; a step of specifying an arrangement situation of the workpiece based on information obtained by imaging the workpiece; a step of specifying a reference line with respect to each measurement point set in the workpiece according to the specified arrangement situation of the workpiece; a step of positioning the first imaging unit on the specified reference line; a step of giving a command to the robot that changes a relative positional relationship between the first imaging unit and the workpiece so that a distance between the first imaging unit and the workpiece is changed in a state in which an optical axis of the first imaging unit is matched with the specified reference line; a step of calculating a first feature amount regarding a degree of focusing of the first imaging unit based on the appearance image captured by the first imaging unit; and a step of determining the distance between the first imaging unit and the workpiece for performing image measurement for the measurement point based on a change in the first feature amount according to a change in the distance between the first imaging unit and the workpiece.

In an embodiment, appropriate imaging can be performed by arranging the imaging unit at an appropriate position with respect to measurement points set in the workpiece.

The above and other characteristics, aspects, and advantages of the disclosure will become apparent from the following detailed description of the disclosure that is understood in conjunction with the accompanying drawings.

DESCRIPTION OF THE EMBODIMENTS

Figure 1:
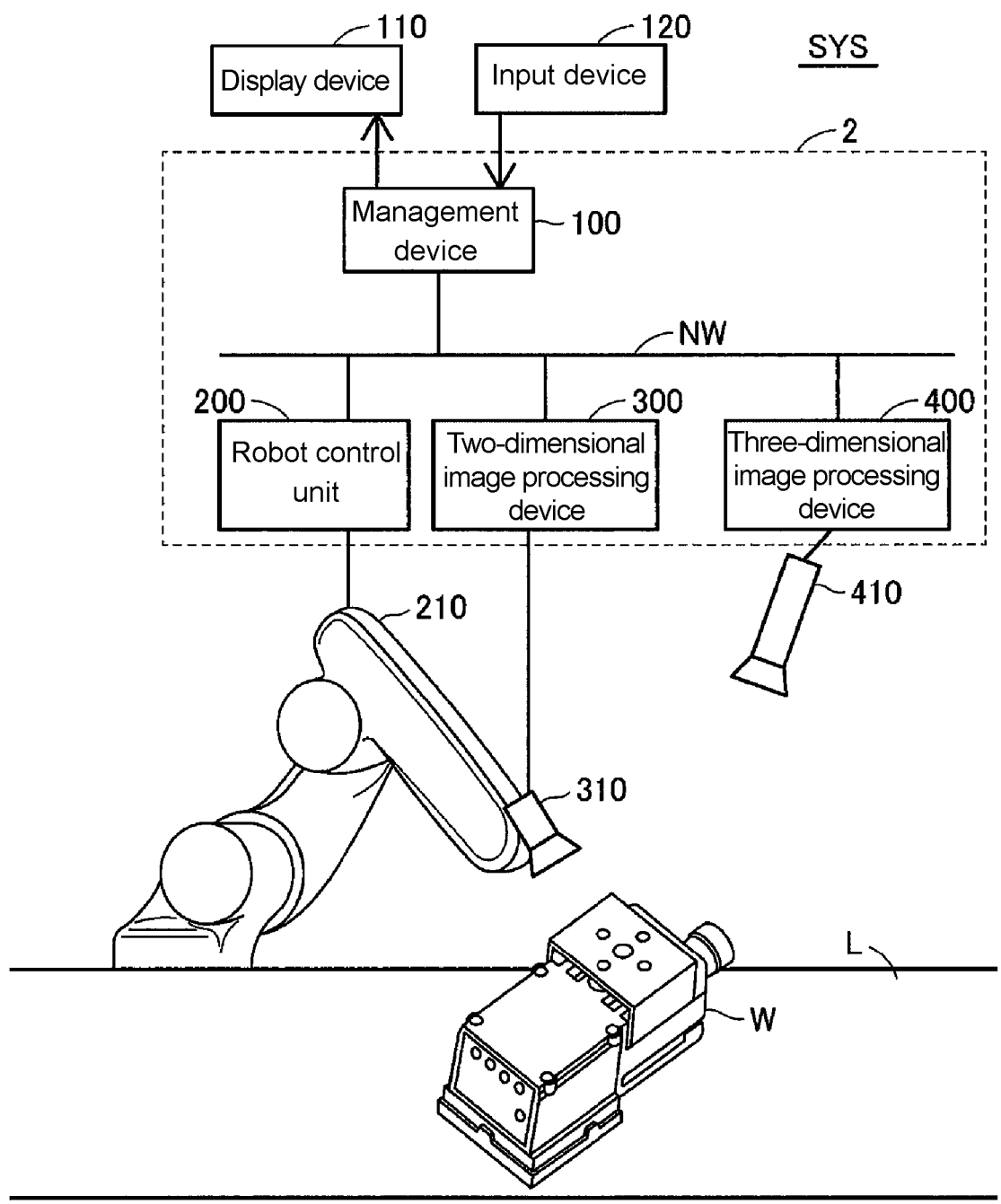
FIG. 1 is a schematic diagram illustrating a basic configuration of an image processing system according to a first embodiment.

Hereinafter, embodiments according to the disclosure will be described with reference to the drawings. In the following description, the same parts and components are denoted with the same reference numerals. Names and functions thereof are also the same. Therefore, detailed description thereof will not be repeated. Note that the embodiments and modification examples described below may be appropriately and selectively combined.

First Embodiment

A. Image Processing System Configuration

FIG. 1 is a schematic diagram illustrating a basic configuration of an image processing system SYS according to a first embodiment. The image processing system SYS illustrated in FIG. 1 is a system for inspecting an appearance of a workpiece W using an appearance image of the workpiece W that is provided by a line L. In the image processing system SYS, an appearance inspection is performed for one or each of a plurality of measurement points set in a predetermined workpiece W.

The image processing system SYS includes an image processing device 2, a robot 210, a two-dimensional camera 310, and a three-dimensional camera 410. Typically, the robot 210 may be an articulated robot, and may be a SCARA type robot or the like. The two-dimensional camera 310 is attached to a distal end of the robot 210. As the robot 210 moves, a position and a posture of the two-dimensional camera 310 are changed. Therefore, the robot 210 can change a relative positional relationship between the two-dimensional camera 310 and the workpiece W.

The three-dimensional camera 410 is provided at a predetermined position over the line L and is arranged so that at least a part of the line L is included in an imaging field of view thereof. When the workpiece W is provided to be located within the imaging field of view of the three-dimensional camera 410 by the line L, the three-dimensional camera 410 can image the workpiece W.

The image processing device 2 includes a management device 100, a robot control unit 200, a two-dimensional image processing device 300, and a three-dimensional image processing device 400. In the first embodiment, the image processing device 2 includes four devices, but it may include one device or may include two or more devices or five or more devices.

The management device 100 is connected to each of the robot control unit 200, the two-dimensional image processing device 300, and the three-dimensional image processing device 400 over a network NW. The network NW is, for example, a field network. As an example, EtherCAT (registered trademark), EtherNet/IP (registered trademark), or the like is adopted as the network NW.

Further, the management device 100 is electrically connected to a display device 110 and an input device 120. The robot control unit 200 is electrically connected to the robot 210. The two-dimensional image processing device 300 is electrically connected to the two-dimensional camera 310. The three-dimensional image processing device 400 is electrically connected to the three-dimensional camera 410. Note that the electrically connected devices may be configured integrally. That is, the robot 210 and the robot control unit 200 may be configured integrally. The two-dimensional image processing device 300 and the two-dimensional camera 310 may be configured integrally. The three-dimensional image processing device 400 and the three-dimensional camera 410 may be configured integrally.

B. Hardware Configuration of Image Processing System SYS

Figure 2:
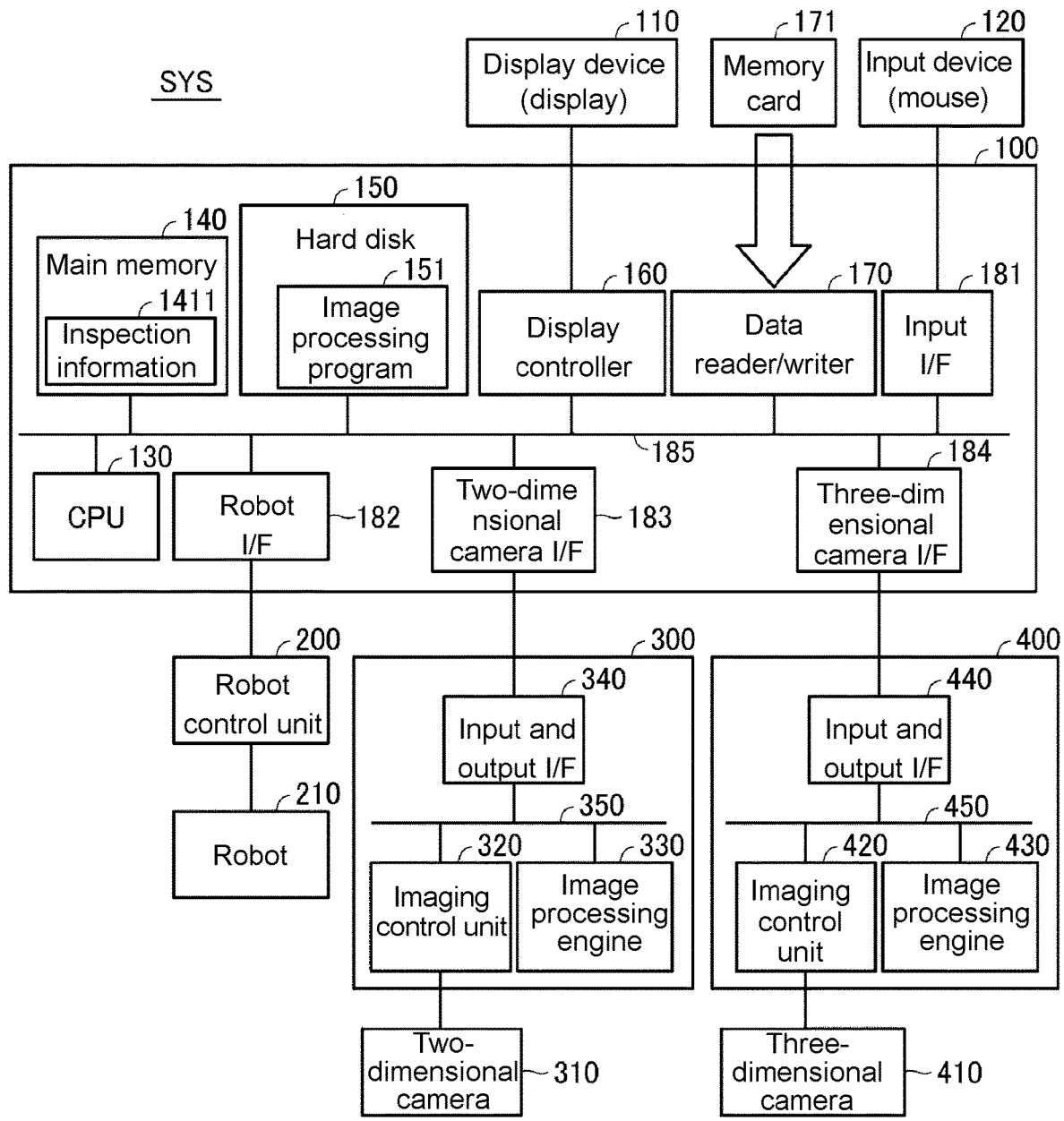
FIG. 2 is a schematic diagram illustrating a hardware configuration of the image processing system.

FIG. 2 is a schematic diagram illustrating a hardware configuration of the image processing system SYS. The management device 100 includes a central processing unit (CPU) 130 which is an arithmetic processing unit, a main memory 140 and a hard disk 150 as storage units, a display controller 160, a data reader/writer 170, an input interface (I/F) 181, a robot interface (I/F) 182, a two-dimensional camera interface (I/F) 183, and a three-dimensional camera interface (I/F) 184. These units are connected via a bus 185 so that the units can communicate data with each other.

The CPU 130 develops, in the main memory 140, programs (codes) including an image processing program 151 installed in the hard disk 150 and executes the programs in a predetermined order to execute various calculations.

The main memory 140 is typically a volatile storage device such as a dynamic random access memory (DRAM). The main memory 140 holds, for example, inspection information 1411 for inspecting an appearance of the workpiece W, an image processing result sent from the two-dimensional image processing device 300 or the three-dimensional image processing device 400, a processing result of the CPU 130, and information on a position and posture (coordinate values (X, Y, Z) and angles (θx, θy, θz) on three-dimensional coordinates) of the robot 210, the two-dimensional camera 310 and the three-dimensional camera 410, in addition to the program read from the hard disk 150.

For example, the inspection information 1411 includes three-dimensional CAD information of the workpiece W, a coordinate position of a measurement point of the workpiece W, a normal vector indicating the direction of a reference line with respect to the measurement point, inspection content of the inspection at the measurement point, an inspection order when there are a plurality of measurement points, and a moving path of the two-dimensional camera 310 at the time of inspection. Further, the inspection information 1411 is provided for each type of workpiece W. Examples of a type of the workpiece W include an engine block and a plastic bottle.

Various setting values or the like may be stored in the hard disk 150. A semiconductor storage device such as a flash memory may be adopted in addition to the hard disk 150 or in place of the hard disk 150.

The display controller 160 is connected to a display that is the display device 110, and notifies a user of a processing result or the like in the CPU 130. That is, the display controller 160 is connected to the display device 110 and controls a display on the display device 110.

The data reader/writer 170 relays data transfer between the CPU 130 and a memory card 171 that is a recording medium. That is, a program or the like that is executed by the management device 100 is stored in the memory card 171 and distributed, and the data reader/writer 170 reads the program from the memory card 171. In response to an internal command of the CPU 130, the data reader/writer 170 writes an image processing result sent from the two-dimensional image processing device 300 or the three-dimensional image processing device 400, a processing result of the CPU 130, or the like to the memory card 171. Note that the memory card 171 includes a general-purpose semiconductor storage device such as Compact Flash (CF; registered trademark), Secure Digital (SD), a magnetic storage medium such as a flexible disk, or an optical storage medium such as a compact disc read only memory (CD-ROM).

The input I/F 181 relays data transfer between the CPU 130 and the input device 120 such as a mouse, a keyboard, a touch panel, or the like. That is, the input I/F 181 receives an operation command that is given by the user operating the input device 120. The operation command includes, for example, a command for designating a measurement point of the workpiece W, a command for designating the workpiece W, and a command for starting an inspection.

The robot I/F 182 relays data transfer between the CPU 130 and the robot control unit 200. That is, the robot I/F 182 is connected to the robot control unit 200. Further, the robot I/F 182 gives a command for instructing the robot control unit 200 to perform movement according to an internal command from the CPU 130.

The two-dimensional camera I/F 183 relays data transfer between the CPU 130 and the two-dimensional image processing device 300. That is, the two-dimensional camera I/F 183 is connected to the two-dimensional image processing device 300 for processing a two-dimensional image obtained by imaging the workpiece W. Further, the two-dimensional camera I/F 183 gives a command for instructing the two-dimensional image processing device 300 to execute various image processing according to an internal command from the CPU 130.

The three-dimensional camera I/F 184 relays data transfer between the CPU 130 and the three-dimensional image processing device 400. Further, the three-dimensional camera I/F 184 gives a command for instructing the three-dimensional image processing device 400 to execute various image processing according to an internal command from the CPU 130.

The robot control unit 200 controls an operation of the robot 210 according to the command that is given from the robot I/F 182. The operation of the robot 210 is an operation of changing a position and a posture of the two-dimensional camera 310 attached to the robot 210. That is, it can be said that the robot control unit 200 controls the position and the posture of the two-dimensional camera 310.

The two-dimensional image processing device 300 includes an imaging control unit 320, an image processing engine 330, and an input and output I/F 340. The units are connected via a bus 350 so that the units can communicate data with each other. According to a command from the image processing engine 330, the imaging control unit 320 controls an imaging operation in the connected two-dimensional camera 310. The image processing engine 330 executes various types of image processing instructed by the CPU 130 via the input and output I/F 340. The input and output I/F 340 transmits results of various types of image processing executed by the image processing engine 330 to the management device 100 via the two-dimensional camera I/F 183. Further, the input and output I/F 340 receives various commands sent from the CPU 130 via the two-dimensional camera I/F 183.

The three-dimensional image processing device 400 includes an imaging control unit 420, an image processing engine 430, and an input and output I/F 440. The units are connected via a bus 450 so that the units can communicate data with each other. Among hardware included in the three-dimensional image processing device 400, hardware having the same name as the hardware included in the two-dimensional image processing device 300 has the same function as the hardware having the same name, and description thereof is omitted.

The two-dimensional camera 310 and the three-dimensional camera 410 are imaging units that image a subject that is present in the imaging field of view. The two-dimensional camera 310 includes an optical system such as a lens or an aperture, and a light reception element such as a charge coupled device (CCD) image sensor and a complementary metal oxide semiconductor (CMOS) image sensor as main components. Typically, the three-dimensional camera 410 is an active three-dimensional camera, and includes a projector that projects a pattern for measurement, and a camera, and main components of the camera include an optical system such as a lens or an aperture, and a light reception element such as a CCD image sensor or a CMOS image sensor. Note that a passive stereo camera may be used.

The two-dimensional camera 310 performs imaging according to a command from the two-dimensional image processing device 300 and outputs the two-dimensional image data obtained by the imaging to the two-dimensional image processing device 300.

The three-dimensional camera 410 performs imaging according to a command from the three-dimensional image processing device 400 and outputs three-dimensional image data obtained by the imaging to the three-dimensional image processing device 400.

C. Overview of Image Processing System

Next, an overview of the image processing system SYS will be described. The image processing system SYS is a system for inspecting an appearance of the workpiece W for one or a plurality of measurement points Wp set in the workpiece W. The process regarding the appearance inspection of the workpiece W that is executed in the image processing system SYS includes a process of focusing the two-dimensional camera 310 on the measurement point Wp of the workpiece W, and a process of executing an inspection in a state in which the two-dimensional camera 310 is focused on the measurement point Wp. To inspect the appearance of the workpiece W for each measurement point Wp means to perform an appearance inspection on a measurement region including the measurement points Wp at each measurement point Wp set in the workpiece W. The measurement point Wp is a point that represents the measurement region, and corresponds to a reference point for matching an optical axis of the two-dimensional camera 310.

In the image processing system SYS, the appearance inspection of the entire workpiece W is performed by repeating the process of focusing the two-dimensional camera 310 on the measurement point Wp of the workpiece W and the process of executing the inspection in a state in which the two-dimensional camera 310 is focused on the measurement point Wp.

The process of focusing the two-dimensional camera 310 on the measurement point Wp of the workpiece W includes a process of specifying a reference line with respect to the measurement point Wp, and a process of focusing the two-dimensional camera 310 on the measurement point Wp on the specified reference line. In the image processing system SYS, the two-dimensional camera 310 can be positioned on the specified normal V. Here, the "reference line" is a line that serves as a reference when the direction of the two-dimensional camera 310 is set, and includes a normal, which is a perpendicular line substantially perpendicular to a micro-plane of the workpiece W at which the measurement point Wp is located, or a line that is arbitrarily set by the user. In the embodiment, the reference line will be described as the normal V.

Figure 3:
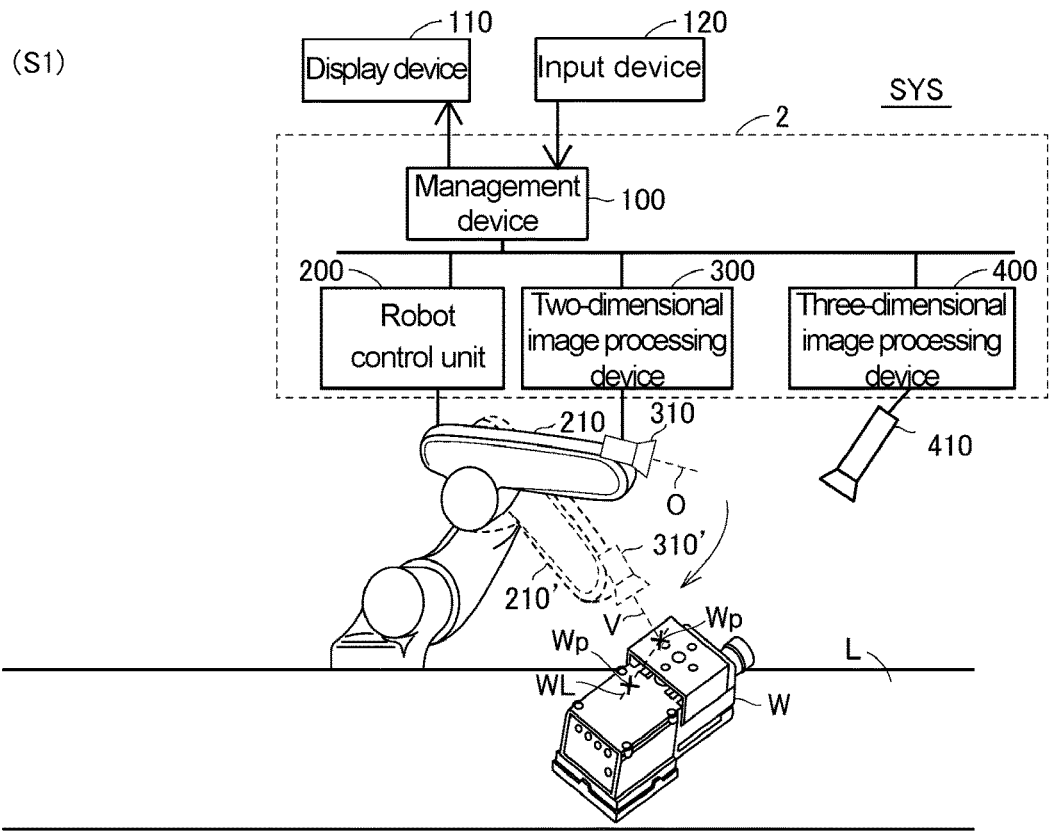
FIG. 3 is a diagram illustrating an example of a movement of a robot when a process of adjusting focus of a two-dimensional camera to a measurement point of a workpiece is executed.
Figure 3:
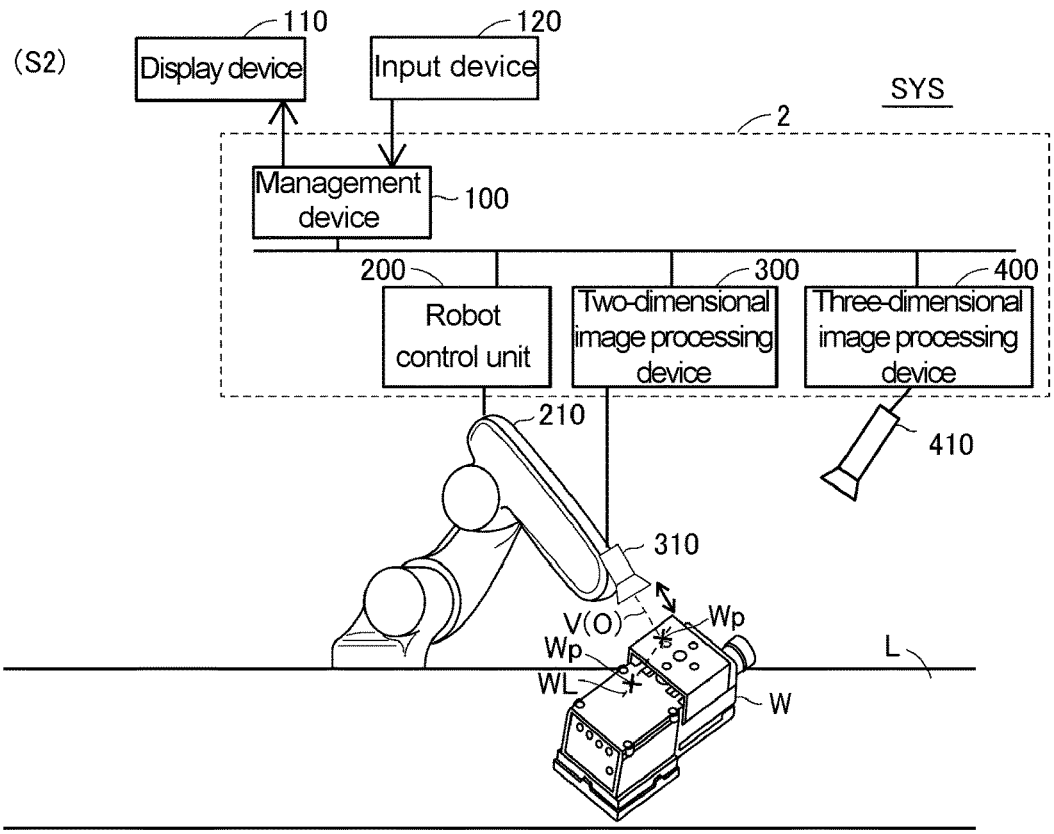

A specific movement of the robot 210 when the process of focusing the two-dimensional camera 310 on the measurement point Wp of the workpiece W is executed will be described with reference to FIG. 3. FIG. 3 is a diagram illustrating an example of the movement of the robot 210 when the process of focusing the two-dimensional camera 310 on the measurement point Wp of the workpiece W is executed.

FIG. 3 illustrates a movement of the robot 210 when the process of positioning the two-dimensional camera 310 on the normal V (step S1) is executed and a movement of the robot 210 when the process of focusing the two-dimensional camera 310 on the normal V (step S1) is executed.

In step S1, the management device 100 specifies an arrangement situation of the workpiece W based on the information obtained by imaging the workpiece W. Here, the arrangement situation is a concept including not only the position of the workpiece W but also the direction of the workpiece W. The management device 100 specifies the normal V with respect to each measurement point Wp set in the workpiece W according to the specified arrangement situation of the workpiece W. Here, when a plurality of measurement points Wp are set as illustrated in FIG. 3, the inspection path WL is generated by specifying the normal V. That is, in order to generate the inspection path WL, it is necessary for the management device 100 to specify the arrangement situation of the workpiece W and also specify the normal V with respect to each measurement point Wp set in the workpiece W according to the specified arrangement situation of the workpiece W.

The management device 100 determines the position and the posture of the two-dimensional camera 310 so that the specified normal V matches an optical axis O of the two-dimensional camera 310, and transmits information on the determined position and posture of the two-dimensional camera 310 to the robot control unit 200. The robot control unit 200 sends an operation command to the robot 210 based on the received information on the position and the posture of the two-dimensional camera 310. Accordingly, the posture of the robot 210 is changed to a posture of a robot 210' indicated by a broken line in FIG. 3 (S1), and the position and the posture of the two-dimensional camera 310 are changed to a position and a posture of the two-dimensional camera 310' indicated by a broken line in FIG. 3 (S1).

In step S2, the management device 100 generates a normal trajectory for moving the two-dimensional camera 310 in a state in which the determined normal V and the optical axis O of the two-dimensional camera 310 match. The management device 100 transmits information on the generated normal trajectory and a command for instructing the operation to the robot control unit 200. Accordingly, the robot 210 moves the two-dimensional camera 310 in a direction of a double-headed arrow in FIG. 3 (S2) to change a distance between the two-dimensional camera 310 and the measurement point Wp.

Further, in step S2, the management device 100 instructs the two-dimensional image processing device 300 to calculate a feature amount regarding a degree of focusing a of the two-dimensional camera 310 based on the two-dimensional image captured by the two-dimensional camera 310. Here, the "degree of focusing a" is an index indicating how focused the two-dimensional camera 310 is. Note that, hereinafter, the feature amount regarding the degree of focusing a is also simply referred to as degree of focusing a. The management device 100 obtains the degree of focusing a of the two-dimensional camera 310 at each of positions at which the distance between the measurement point Wp and the two-dimensional camera 310 is different. The management device 100 determines the distance between the two-dimensional camera 310 and the measurement point Wp in which the two-dimensional camera 310 is focused on the measurement point Wp based on a change in the degree of focusing a according to a change in the distance between the two-dimensional camera 310 and the measurement point Wp.

Thus, the image processing system SYS can specify the normal V with respect to the measurement point Wp of the set workpiece W according to the arrangement situation of the workpiece W provided by the line L. Further, the image processing system SYS can focus the two-dimensional camera 310 on the measurement point Wp by changing the distance between the two-dimensional camera 310 and the measurement point Wp. As a result, it is possible to focus the two-dimensional camera 310 on the measurement point Wp without changing the optical system of the two-dimensional camera 310. Therefore, in the image processing system SYS, accurate appearance inspection can be executed. Further, in the image processing system SYS, the management device 100 determines the normal V of the measurement point Wp based on the appearance image, and determines a position at which the two-dimensional camera 310 is focused on the measurement point Wp based on the degree of focusing a of the two-dimensional camera 310 when the two-dimensional camera 310 has been moved along the normal V. Therefore, in the image processing system SYS, it is possible to adjust a positional relationship between the position of the workpiece W provided by the line L and the two-dimensional camera 310.

D. Inspection Process

A process regarding the appearance inspection of the workpiece W that is executed in the image processing system SYS includes the process of focusing the two-dimensional camera 310 on the measurement point Wp of the workpiece W and the process of executing the inspection in a state in which the two-dimensional camera 310 is focused on the measurement point Wp. The process of focusing the two-dimensional camera 310 on the measurement point Wp of the workpiece W includes a process of specifying the normal V with respect to the measurement point, and a process of focusing the two-dimensional camera 310 on the measurement point Wp on the specified normal V.

More specifically, the process of specifying the normal V with respect to the measurement point Wp includes a process of specifying the arrangement state of the workpiece W based on the information obtained by imaging the workpiece W, and a process of specifying the normal V with respect to each measurement point Wp set in the workpiece W according to the specified arrangement state.

In the first embodiment, the process of specifying the normal V with respect to the measurement point Wp is performed using the three-dimensional camera 410 and the two-dimensional camera 310. Specifically, the process of specifying the normal V with respect to the measurement point Wp includes a process of determining the normal V with respect to each measurement point Wp set in the workpiece W based on the three-dimensional image captured by the three-dimensional camera 410 and a process of correcting the normal V determined in a state in which the two-dimensional camera 310 is positioned on the determined normal V, based on the two-dimensional image captured by the two-dimensional camera 310.

That is, in the first embodiment, the process of specifying the normal V with respect to the measurement point Wp includes (1) a process of specifying the arrangement situation of the workpiece W based on the three-dimensional image, (2) a process of determining the normal V with respect to each measurement point Wp set in the workpiece W according to the arrangement situation specified based on the three-dimensional image, (3) a process of specifying the arrangement situation of the workpiece W based on the two-dimensional image captured by the two-dimensional camera 310 in a state in which the two-dimensional camera 310 has been positioned on the determined normal V, and (4) a process of correcting the determined normal V according to the arrangement situation specified based on the two-dimensional image.

Figure 4:
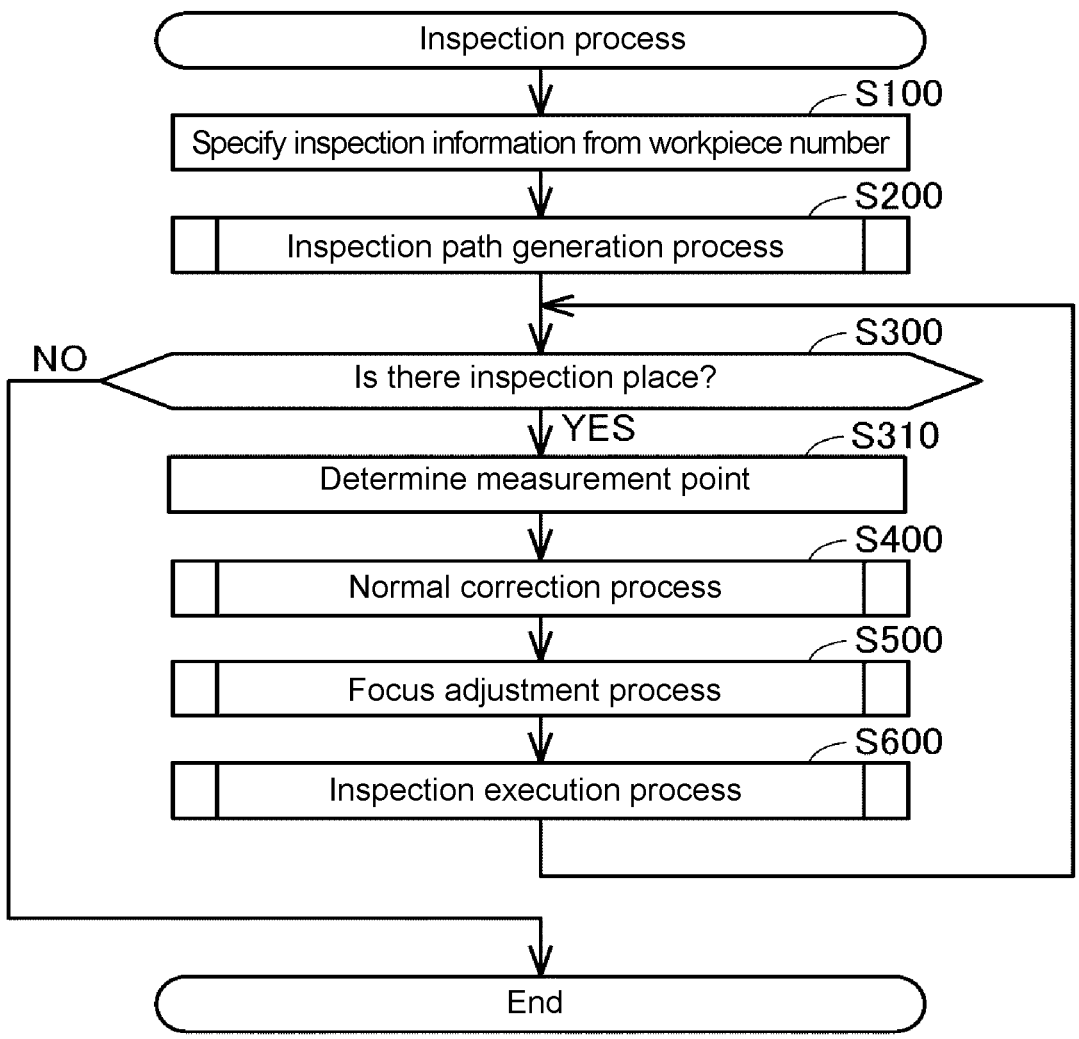
FIG. 4 is a flowchart of an inspection process.

An inspection process that is executed by the CPU 130 of the management device 100 in order to realize a process regarding an appearance inspection of the workpiece W that is executed in the image processing system SYS will be described with reference to FIG. 4. FIG. 4 is a flowchart of the inspection process. The CPU 130 executes the inspection process based on reception of a command to execute an inspection of the workpiece W. The command to execute the inspection of the workpiece W is input from, for example, the input device 120 by the user. Note that the command to execute an inspection of the workpiece W may be input from the three-dimensional image processing device 400 or a device (not illustrated) that manages the line L according to the workpiece W provided within the imaging field of view of the three-dimensional camera 410. In the first embodiment, it is assumed that the CPU 130 receives a workpiece number by which a type of the workpiece W can be specified, together with the command to execute an inspection of the workpiece W.

In step S100, the CPU 130 specifies the inspection information 1411 corresponding to the workpiece number from among the plurality of pieces of inspection information 1411 stored in the main memory 140.

In step S200, the CPU 130 specifies the arrangement situation of the workpiece W based on the three-dimensional image of the workpiece W imaged by the three-dimensional camera 410 and executes an inspection path generation process to generate an inspection path WL. (1) A process of specifying the arrangement situation of the workpiece W based on the three-dimensional image and (2) a process of determining a normal V with respect to each measurement point Wp set in the workpiece W according to the arrangement situation specified based on the three-dimensional image are performed by the CPU 130 executing the inspection path generation process.

In step S300, the CPU 130 determines whether or not there is an inspection place. Specifically, the CPU 130 determines whether or not there is a measurement point Wp that has not been inspected. When all the measurement points Wp have been inspected (NO in step S300), the CPU 130 ends the inspection process. When there is a measurement point Wp that has not been inspected (YES in step S300), the CPU 130 switches the control to step S310.

In step S310, the CPU 130 determines one measurement point Wp that has not been inspected.

In step S400, the CPU 130 executes a normal correction process. The normal correction process is a process of correcting a normal V with respect to one measurement point Wp that has not been inspected. By the CPU 130 executing the normal correction process, (3) a process of specifying the arrangement situation of the workpiece W based on the two-dimensional image captured by the two-dimensional camera 310 in a state in which the two-dimensional camera 310 is positioned on the determined normal V, and (4) a process of correcting the determined normal V according to the arrangement situation of the workpiece W specified based on the two-dimensional image are performed.

In step S500, the CPU 130 executes a focus adjustment process. The focus adjustment process is a process of focusing the two-dimensional camera 310 on the measurement point Wp. By the CPU 130 performing the focus adjustment process, a process of focusing the two-dimensional camera 310 on the measurement point Wp on the determined normal V is performed.

In step S600, the CPU 130 executes an inspection execution process. The inspection execution process is a process of executing an inspection at the measurement point Wp. By the CPU 130 executing the inspection executing process, a process of executing the inspection in a state in which the two-dimensional camera 310 is focused on the measurement point Wp is performed.

E. Functional Configuration of Image Processing Device

Figure 5:
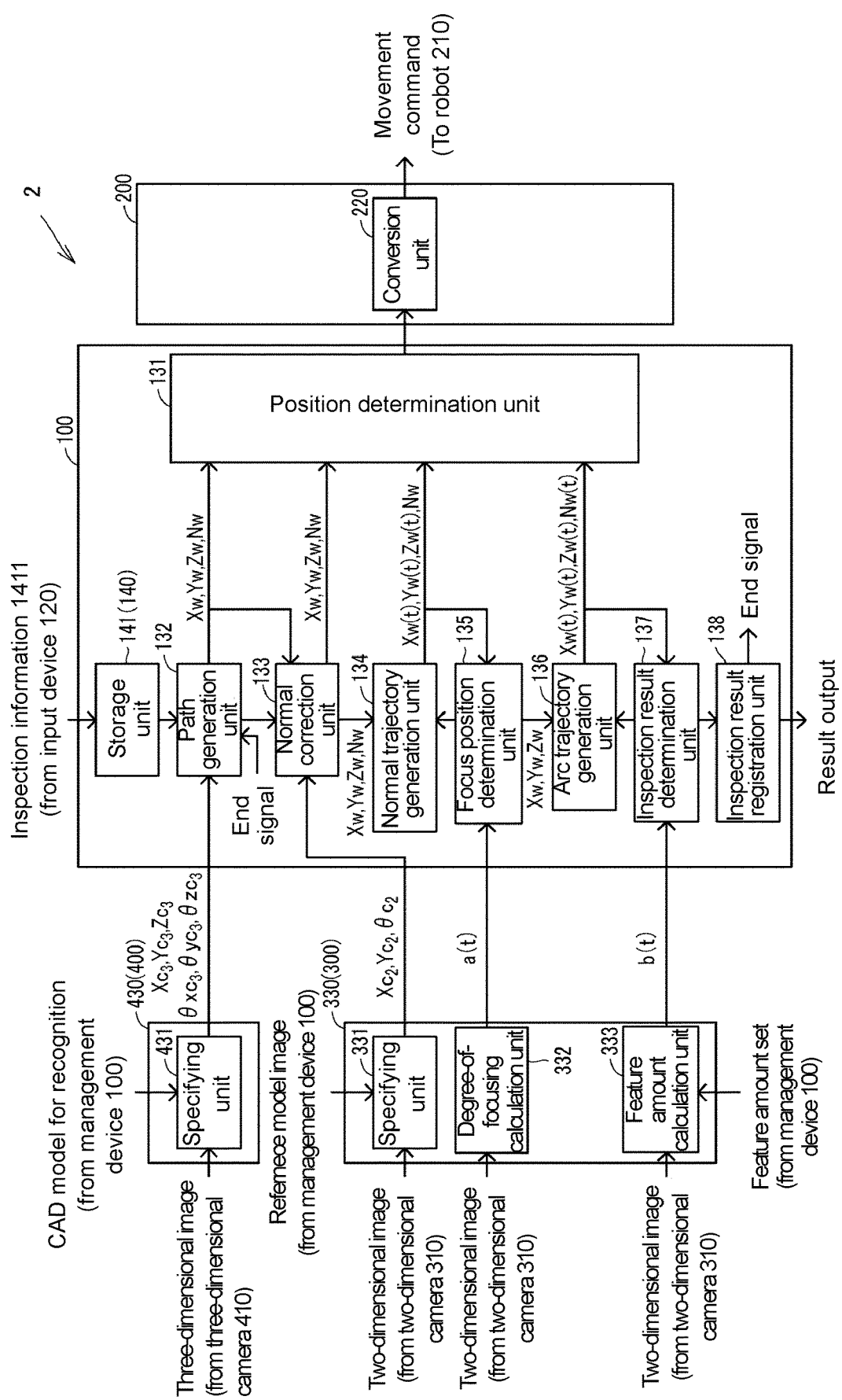
FIG. 5 is a diagram illustrating an example of a functional configuration of an image processing device.

All functions of the image processing device 2 will be described with reference to FIG. 5. FIG. 5 is a diagram illustrating an example of a functional configuration of the image processing device 2. As described above, the image processing device 2 includes the management device 100, the robot control unit 200, the two-dimensional image processing device 300, and the three-dimensional image processing device 400.

The management device 100 includes a main memory 140 which is a storage unit. The main memory 140 includes a storage unit 141 as a functional configuration for storing the inspection information 1411. Further, the management device 100 includes, as other functional configurations, a position determination unit 131, a path generation unit 132, a normal correction unit 133, a normal trajectory generation unit 134, a focus position determination unit 135, an arc trajectory generation unit 136, an inspection result determination unit 137, and an inspection result registration unit 138. The position determination unit 131, the path generation unit 132, the normal correction unit 133, the normal trajectory generation unit 134, the focus position determination unit 135, the arc trajectory generation unit 136, the inspection result determination unit 137, and the inspection result registration unit 138 are typically realized by the CPU of the management device 100 executing the program.

The robot control unit 200 includes a conversion unit 220 that converts information on a position and a posture of the two-dimensional camera 310 in a world coordinate system into information on a position and a posture of the two-dimensional camera 310 in a robot coordinate system as a functional configuration. Specifically, the conversion unit converts position coordinates (Xw, Yw, Zw) in the world coordinate system to position coordinates (Xr, Yr, Zr) in the robot coordinate system and converts information (Nw) on the direction in the world coordinate system into information (Nr) on the direction in the robot coordinate system. Here, the information on the direction is indicated by a vector, for example. Note that the information on the direction may be indicated by an angle.

The two-dimensional image processing device 300 includes an image processing engine 330. The image processing engine 330 includes a specifying unit 331, a degree-of-focusing calculation unit 332, and a feature amount calculation unit 333 as functional configurations.

The three-dimensional image processing device 400 includes an image processing engine 430. The image processing engine 430 includes a specifying unit 431 as a functional configuration.

Note that some or all of the functional configurations of the image processing device 2 illustrated in FIG. 5 may be realized by using a hard-wired circuit such as an application sub-layer (ASL) or a field programmable gate array (FPGA). Note that some or all of the functions of the management device 100, the robot control unit 200, the two-dimensional image processing device 300, and the three-dimensional image processing device 400 may be implemented in other devices.

The storage unit 141 stores information on the inspection path WL input from the input device 120. When the information on the inspection path WL is input from the input device 120, the CPU 130 records the information in the storage unit 141. Note that the information stored in the storage unit 141 is not limited to the information input from the input device 120, and includes information read from the memory card 171 and/or the hard disk 150. For example, a coordinate position (Xm, Ym, Zm) on 3D CAD of each measurement point Wp and a normal vector (Nm) with respect to each measurement point Wp are included as the information on the inspection path WL.

The position determination unit 131 determines a position and a direction of the two-dimensional camera 310 in the world coordinate system from the information on the position and the direction of the two-dimensional camera 310 sent from the path generation unit 132, the normal correction unit 133, the normal trajectory generation unit 134, the focus position determination unit 135, and the arc trajectory generation unit 136. The position determination unit 131 transmits the information on the position and the direction of the two-dimensional camera 310 in the world coordinate system to the robot control unit 200.

The specifying unit 431 of the three-dimensional image processing device 400 specifies the arrangement situation of the workpiece W provided by the line L from the three-dimensional image. As an example, the specifying unit 431 calculates the arrangement situation of the workpiece W through the three-dimensional image process such as three-dimensional pattern matching or an iterative closest point (ICP). Typically, the position of the workpiece W measured by the specifying unit 431 is represented by a coordinate value $(Xc_3, Yc_3, Zc_3)$ [pixcel] of a camera coordinate system in the three-dimensional camera 410. Further, the direction of the workpiece W measured by the specifying unit 431 is typically represented by a rotation angle $(\theta xc_3, \theta yc_3, \theta zc_3)$ [radians] around an x axis, a y axis, and a z axis of the camera coordinate system in the three-dimensional camera 410. The position and slope of the workpiece W measured by the specifying unit 431 are sent to the management device 100.

The path generation unit 132 generates an inspection path WL based on the position and the direction of the workpiece W in the camera coordinate system of the three-dimensional camera 410 sent from the specifying unit 431, and the inspection information 1411 of the workpieces W stored in the storage unit 141. Typically, the inspection path WL is represented by the coordinate position (Xw, Yw, Zw) [mm] and the normal vector (Nw) in the world coordinate system. That is, the path generation unit 132 determines the normal V with respect to each measurement point Wp set in the workpiece W according to the arrangement situation specified based on the three-dimensional image.

Further, the path generation unit 132 manages the start and the end of the inspection. Specifically, the path generation unit 132 generates an inspection path WL based on reception of a command to start an inspection. The path generation unit 132 determines the position and the direction (Xw, Yw, Zw, Nw) of the two-dimensional camera 310 based on the generated inspection path WL, and issues a command to the position determination unit 131. Further, the path generation unit 132 receives an end signal indicating that the inspection has been completed for one measurement point, determines the position and the direction (Xw, Yw, Zw) of the two-dimensional camera 310 in order to position the two-dimensional camera 310 at the next measurement point Wp, and issues a command to the position determination unit 131. The path generation unit 132 ends the inspection based on reception of an end signal for all the measurement points Wp.

Thus, in the first embodiment, the path generation unit 132 receives the end signal indicating the end of the inspection and instructs the robot control unit 200 to sequentially move the two-dimensional camera 310. Therefore, it is unnecessary to instruct the management device 100 to confirm that the user has completed the inspection at the measurement point and start the inspection at the next measurement point Wp after the confirmation. That is, the image processing system SYS according to the first embodiment includes the path generation unit 132, thereby improving operability for the user.

The specifying unit 331 of the two-dimensional image processing device 300 specifies information for correcting the normal V of the measurement point Wp determined by the path generation unit 132 from the two-dimensional image. As an example, the specifying unit 331 calculates information for correcting the normal V of the measurement point Wp through image processing such as pattern matching. Here, the information for correcting the normal V of the measurement point Wp is information on the position of the measurement point Wp. Typically, the position of the measurement point Wp calculated by the specifying unit 431 is represented by a coordinate value $(Xc_2, Yc_2)$ [pixcel] of the camera coordinate system in the two-dimensional camera 310 and a rotation angle $\theta c_2$ [radians] around the normal serving as an axis. The information on the position of the measurement point Wp measured by the specifying unit 331 is sent to the management device 100.

The normal correction unit 133 corrects the normal V of the measurement point Wp determined by the path generation unit 132. Specifically, the normal correction unit 133 specifies the normal V of the measurement point Wp based on the information on the position of the measurement point Wp measured by the specifying unit 331. That is, the normal correction unit 133 indirectly specifies the normal V of the measurement point Wp based on the two-dimensional image. Hereinafter, the normal V of the measurement point Wp specified based on the two-dimensional image is also referred to as a "measured normal V of the measurement point Wp" (an actually measured value). On the other hand, the normal V of the measurement point Wp referred to in positioning the two-dimensional camera 310 is also referred to as a "determined normal V of the measurement point Wp" (a designated value).

The normal correction unit 133 calculates a discrepancy value between the measured normal V of the measurement point Wp and the determined normal V of the measurement point Wp, corrects the determined position of the measurement point Wp based on the discrepancy value, and determines the position of the measurement point Wp again. The normal correction unit 133 determines the position and the direction (Xw, Yw, Zw, Nw) of the two-dimensional camera 310 based on the determined position of the measurement point Wp, and transmits the position and the direction (Xw, Yw, Zw, Nw) to the position determination unit 131. The normal correction unit 133 determines the position and the normal vector of the measurement point Wp based on the discrepancy value becoming equal to or smaller than a predetermined value. The normal correction unit 133 transmits the position and the normal vector of the measurement point Wp (Xw, Yw, Zw, Nw) that have been determined, to the normal trajectory generation unit 134.

The normal trajectory generation unit 134 generates a normal trajectory (Xw(t), Yw(t), Zw(t)) of the two-dimensional camera 310 for changing the distance between the two-dimensional camera 310 and the measurement point Wp in a state in which the optical axis O of the two-dimensional camera 310 is matched with the normal V with respect to the measurement point Wp based on the position and the normal vector of the measurement point Wp that have been received. The normal trajectory generation unit 134 transmits, for example, the generated normal trajectory, and the movement range to the position determination unit 131 and the focus position determination unit 135.

The degree-of-focusing calculation unit 332 calculates a degree of focusing a from the two-dimensional image and transmits a relationship a(t) between the degree of focusing a and a time t when the two-dimensional camera 310 has captured the two-dimensional image to the focus position determination unit 135.

The focus position determination unit 135 specifies a position at which the degree of focusing a is highest from information such as the degree of focusing a(t) of the two-dimensional image transmitted from the degree-of-focusing calculation unit 332 and the normal trajectory transmitted from the normal trajectory generation unit 134. The focus position determination unit 135 designates a movement range from the specified position as necessary and instructs the normal trajectory generation unit 134 to generate a normal trajectory. The focus position determination unit 135 determines the focus position (Xw, Yw, Zw) based on sufficient information to determine the focus position being obtained from the degree-of-focusing calculation unit 332, and transmits the focus position (Xw, Yw, Zw) to the arc trajectory generation unit 136.

The arc trajectory generation unit 136 generates the arc trajectory so that the angle formed between the normal vector V with respect to the measurement point and the optical axis O of the two-dimensional camera 310 is changed in a state in which the distance between the two-dimensional camera 310 and the measurement point Wp at the focus position sent from the focus position determination unit 135 is maintained. The arc trajectory generation unit 136 generates an arc trajectory (Xw(t), Yw(t), Zw(t), Yw(t), Nw(t)) for the position and the direction of the two-dimensional camera 310 so that the optical axis O of the two-dimensional camera 310 intersects the measurement point Wp. The arc trajectory generation unit 136 transmits, for example, the generated arc trajectory, and the movement range to the position determination unit 131 and the inspection result determination unit 137.

The feature amount calculation unit 333 calculates a feature amount b for executing the inspection determined for each measurement point. The feature amount calculation unit 333 calculates the feature amount b corresponding to inspection content from the two-dimensional image. A method of calculating the feature amount b may be determined from, for example, a type of the workpiece W and the inspection content. The feature amount calculation unit 333 transmits a relationship b(t) between the calculated feature amount b and the time t at which the two-dimensional camera 310 has captured the two-dimensional image to the inspection result determination unit 137.

The inspection result determination unit 137 specifies a direction in which the feature amount b increases, from information such as the feature amount b(t) of the two-dimensional image and the arc trajectory transmitted from the arc trajectory generation unit 136. The inspection result determination unit 137 transmits the direction in which the feature amount b increases to the arc trajectory generation unit 136. When the two-dimensional camera 310 can be moved in the direction in which the feature amount b increases within a range in which the two-dimensional camera 310 can be moved, the arc trajectory generation unit 136 generates, for example, the arc trajectory. The inspection result determination unit 137 specifies a maximum value of the feature amount b when obtaining the feature amount b within the range in which the two-dimensional camera 310 can be moved, and determines an inspection result based on whether or not the maximum value is equal to or greater than a predetermined defined value. The inspection result determination unit 137 transmits the obtained inspection result to the inspection result registration unit 138.

The inspection result registration unit 138 outputs the inspection result sent from the inspection result determination unit 137, and transmits an end signal to the path generation unit 132. The output inspection result is stored in a predetermined region of the main memory 140. The inspection result registration unit 138 may store the inspection result in the main memory 140 and display the inspection result on the display device 110.

F. Inspection Path Generation Process

Figure 6:
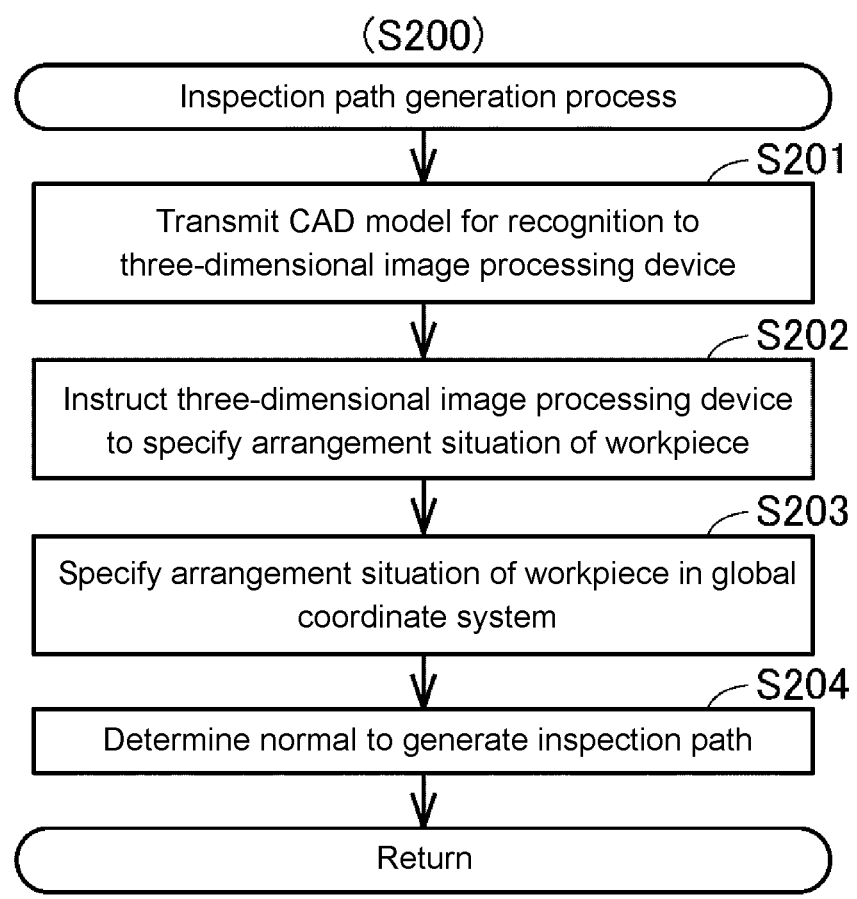
FIG. 6 is a flowchart of an inspection path generation process.
Figure 7:
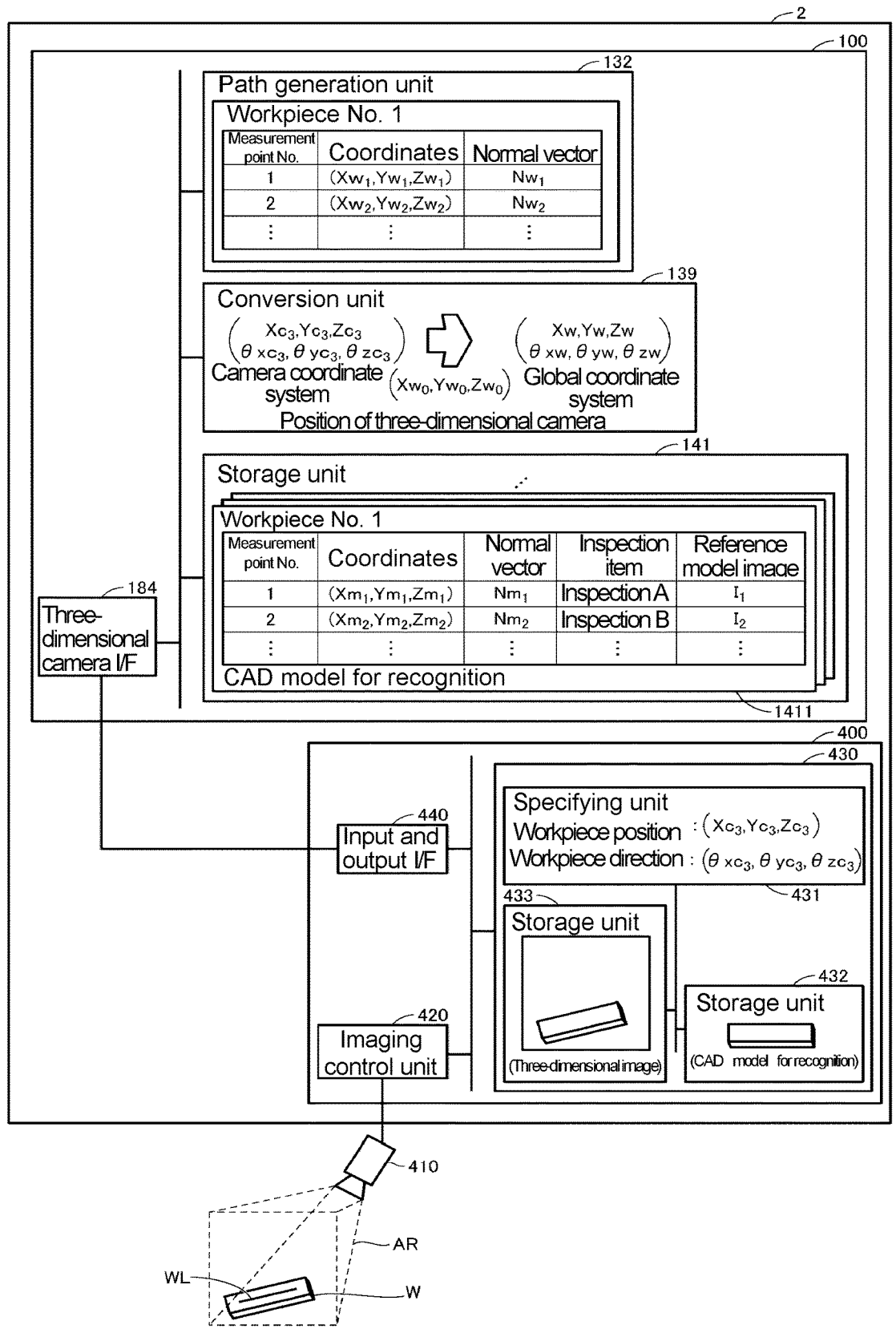
FIG. 7 is a diagram illustrating an example of a functional configuration of an image processing device that functions in execution of the inspection path generation process.

The inspection path generation process (step S200; see FIG. 4) that is executed by the CPU 130 of the management device 100 will be described in detail with reference to FIGS. 6 and 7. FIG. 6 is a flowchart of the inspection path generation process. FIG. 7 is a diagram illustrating an example of the functional configuration of the image processing device 2 that functions in execution of the inspection path generation process. In FIG. 7, a shape of the workpiece W is simplified and described as compared with FIGS. 1 and 3.

By the CPU 130 executing the inspection path generation process, the arrangement situation of the workpiece W is specified and the normal V with respect to each measurement point Wp set in the workpiece W is specified according to the specified arrangement situation of the workpiece W.

As illustrated in FIG. 4, the inspection path generation process (step S200) is executed after the inspection information 1411 corresponding to the workpiece number has been specified in step S100. For example, the inspection information 1411 is stored for each workpiece number in the storage unit 141 provided in the main memory 140. For example, a CAD model for recognition, a coordinate value (Xmi, Ymi, Zmi) on the 3D CAD of the measurement point Wp for each measurement point number (No. i), a normal vector (Nmi) having a size that is a defined value, an inspection item, and a reference model image (Ii) are stored as the inspection information 1411 in the storage unit 141 (see FIG. 7). The measurement point No. i (i=1, 2, . . . ) indicates an order of measurement, and the path generation unit 132 is controlled to execute an inspection for a measurement point Wp of No. (i+1) next to the measurement point of No. i.

Here, the reference model image (Ii) is a reference image of the measurement point, and may be a reference image included in the imaging region of the two-dimensional camera 310 when the optical axis O of the two-dimensional camera 310 is matched with the normal V with respect to the measurement point Wp of No. i. Further, the reference model image (Ii) is typically generated by computer graphics (CG) rendering from the CAD model for recognition. Note that the reference model image (Ii) may be generated from an image obtained by actually imaging the workpiece W.

After the inspection information 1411 of the workpiece W is specified, the CPU 130 sends a CAD model for recognition of the specified inspection information 1411 to the three-dimensional image processing device 400 in step S201. The three-dimensional image processing device 400 temporarily stores the CAD model for recognition in the storage unit 432 of the image processing engine 430. Further, the three-dimensional image processing device 400 may store the CAD model for recognition for each workpiece number in advance. In this case, the CPU 130 transmits only the workpiece number to the three-dimensional image processing device 400 in step S201.

In step S202, the CPU 130 instructs the three-dimensional image processing device 400 to specify the arrangement situation of the workpiece W.

A method of specifying the arrangement situation of the workpiece W that is executed by the three-dimensional image processing device 400 will be described with reference to FIG. 7. The specifying unit 431 of the three-dimensional image processing device 400 receives a command to specify the arrangement situation of the workpiece W and instructs the imaging control unit 420 to acquire a three-dimensional image. The imaging control unit 420 stores the acquired three-dimensional image in the storage unit 433 of the image processing engine 430. The specifying unit 431 searches for an image region similar to the CAD model for recognition stored in the storage unit 432 in the three-dimensional image stored in the storage unit 433. The specifying unit 431 calculates a position (Xc3, Yc3, Zc3) of the workpiece W in the three-dimensional image and a direction (θxc3, θyc3, θzc3) of the workpiece W in the three-dimensional image from the image region that has been searched for. The specifying unit 431 transmits the calculated position and the calculated direction of the workpiece W in the three-dimensional image to the management device 100.

Referring back to FIG. 6, the inspection path generation process will be described. In step S203, the information on the position of the workpiece W and the direction of the workpiece W is received from the three-dimensional image processing device 400, and in step S203, the CPU 130 specifies the arrangement situation of the workpiece W in the global coordinate system. Specifically, a conversion unit 139 (see FIG. 7) included in the functional configuration of the CPU 130 converts the values (Xc3, Yc3, Zc3, θxc3, θyc3, θzc3) of the camera coordinate system into values (Xw, Yw, Zw, θxw, θyw, θzw) in the global coordinate system based on the coordinate values (Xw$_0$, Yw$_0$, Zw$_0$) of the three-dimensional camera 410 and a predetermined coordinate conversion equation. Accordingly, as illustrated in FIG. 7, the inspection path WL for the workpiece W provided by the line L is generated.

In step S204, the CPU 130 determines the normal V to generate the inspection path WL and returns to the inspection process. Specifically, the path generation unit 132 (see FIG. 7) converts the coordinates (Xmi, Ymi, Zmi) and the normal vector (Nmi) of each measurement point Wpi among the inspection information 1411 stored in the storage unit 141 into the coordinate value (Xwi, Ywi, Zwi) and the normal vector (Nwi) of a global workpiece coordinate system based on the position (Xw, Yw, Zw) and the direction (θxw, θyw, θzi) of the workpiece W of the global coordinate system, and a predetermined conversion equation. The normal V is determined by calculating the coordinate value and the normal vector of the measurement point Wp in the global coordinate system. Further, the inspection path WL is generated by calculating the coordinate value and the normal vector of the measurement point Wp in the global coordinate system. The path generation unit 132 updates the inspection information 1411 of the storage unit 141 with information on the generated inspection path. The path generation unit 132 stores the updated information in the first storage unit 142 (see FIG. 9) of the main memory 140.

Thus, by the CPU 130 executing the inspection path generation process, the three-dimensional image processing device 400 specifies the arrangement situation of the workpiece W based on the three-dimensional image. Further, by the CPU 130 executing the inspection path generation process, the position and the normal vector of each measurement point Wp in the world coordinate system are calculated for each measurement point Wp set in the workpiece W. That is, by the CPU 130 executing the inspection path generation process, the normal V with respect to each measurement point Wp set in the workpiece W is determined according to the specified arrangement situation of the workpiece W.

G. Normal Correction Process

Figure 8:
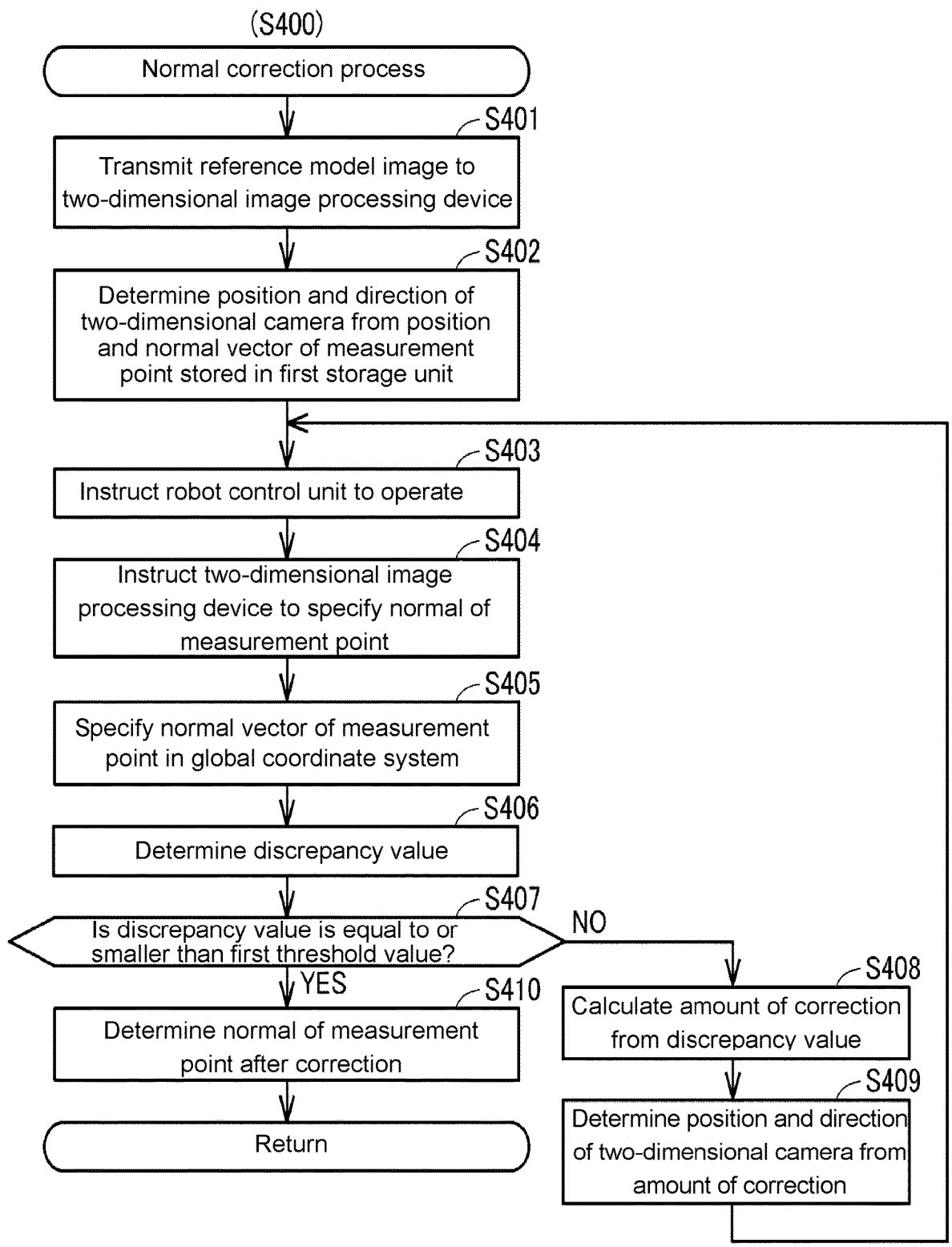
FIG. 8 is a flowchart of a normal correction process.
Figure 9:
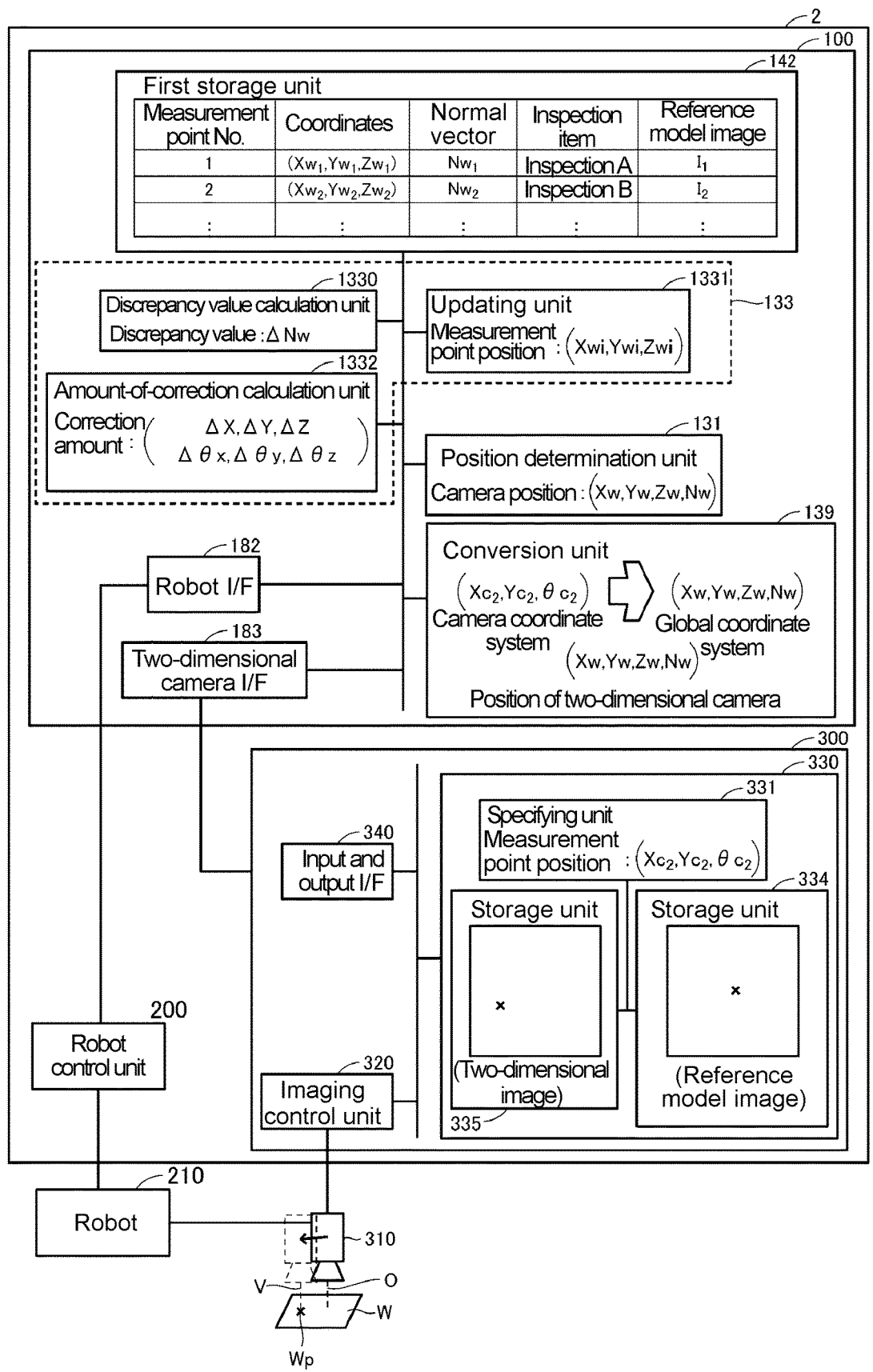
FIG. 9 is a schematic diagram illustrating a functional configuration of a normal determination system.

The normal correction process (step S400; see FIG. 4) that is executed by the CPU 130 of the management device 100 will be described in detail with reference to FIGS. 8 and 9. FIG. 8 is a flowchart of the normal correction process. FIG. 9 is a diagram illustrating an example of a functional configuration of the image processing device 2 that functions in execution of the normal correction process. In FIG. 9, a shape of the workpiece W is simplified and described as compared with FIGS. 1 and 3.

In step S401, the CPU 130 sends the reference model image to the two-dimensional image processing device 300. Specifically, the path generation unit 132 specifies the reference model image for the measurement point Wp determined in step S310 from the first storage unit 142, and transmits the reference model image to the two-dimensional image processing device 300 via the two-dimensional camera I/F 183. The two-dimensional image processing device 300 temporarily stores the reference model image in the storage unit 334 of the image processing engine 330. Note that the two-dimensional image processing device 300 may store a reference model image for each measurement point in advance. In this case, in step S401, the CPU 130 transmits only the measurement point number to the two-dimensional image processing device 300.

In step S402, the CPU 130 determines the position and the direction of the two-dimensional camera 310 from the position and the normal vector of the measurement point Wp stored in the first storage unit 142. Specifically, the path generation unit 132 specifies the coordinate position and the normal vector in the world coordinate system for the measurement point Wp determined in step S310 from the first storage unit 142. The path generation unit 132 determines the direction of the two-dimensional camera 310 so that the specified normal vector matches the optical axis O of the two-dimensional camera 310. Further, the path generation unit 132 determines the position of the two-dimensional camera 310 so that the two-dimensional camera 310 is located on the normal V with respect to the measurement point Wp and the distance between the two-dimensional camera 310 and the measurement point Wp becomes a predetermined distance. Here, the predetermined distance is a distance that is calculated from a focal length of the two-dimensional camera 310 and, theoretically, is a distance at which the two-dimensional camera 310 is focused on the measurement point.

In step S403, the CPU 130 instructs the robot control unit 200 to operate. Specifically, the path generation unit 132 transmits the determined position (Xw, Yw, Zw) and direction (Nw) of the two-dimensional camera 310 to the position determination unit 131. The position determination unit 131 transmits the position and the direction of the two-dimensional camera 310 to the robot control unit 200 via the robot I/F 182 (see FIG. 9).

In step S404, the CPU 130 instructs the two-dimensional image processing device 300 to specify the normal of the measurement point Wp.

A method of specifying the normal of the measurement point Wp that is executed by the two-dimensional image processing device 300 will be described with reference to FIG. 9. The specifying unit 331 of the two-dimensional image processing device 300 receives a command to specify the normal of the measurement point Wp and instructs the imaging control unit 320 to acquire a two-dimensional image. The imaging control unit 320 stores the acquired two-dimensional image in the storage unit 335 of the image processing engine 330.

The specifying unit 331 searches for an image region similar to the reference model image stored in the storage unit 334 in the two-dimensional image stored in the storage unit 335. The specifying unit 331 calculates the position ($Xc_2$, $Yc_2$) of the measurement point Wp in the two-dimensional image and the direction ($\theta c2$) of the measurement point Wp in the two-dimensional image from the image region that has been searched for. The specifying unit 331 transmits the calculated position and the calculated direction of the measurement point Wp in the two-dimensional image to the management device 100.

Referring back to FIG. 8, the normal correction process will be described. Information on the position of the measurement point Wp and the direction of the measurement point Wp are received from the two-dimensional image processing device 300 and, in step S405, the CPU 130 specifies the position of the measurement point Wp and the normal vector of the measurement point Wp in the global coordinate system. Specifically, the conversion unit 139 (see FIG. 9) included in the functional configuration of the CPU 130 converts the value ($Xc_2$, $Yc_2$, $\theta c_2$) of the camera coordinate system into the value (Xw, Yw, Zw, Nw) of the global coordinate system based on the position (Xw, Yw, Zw) and direction (Nw) of the two-dimensional camera 310 that the position determination unit 131 has sent to the robot control unit 200, and a predetermined coordinate conversion equation. Accordingly, the measured normal V (the actually measured value) of the measurement point Wp is specified.

In step S406, the CPU 130 determines a discrepancy value. The discrepancy value is a value indicating a deviation between the measured normal V (an actually measured value) of the measurement point Wp and the determined normal (the defined value) of the measurement point. Here, the position and the direction of the two-dimensional camera 310 are determined so that the determined normal V (the defined value) of the measurement point Wp is matched with the optical axis O of the two-dimensional camera 310. Therefore, the discrepancy value is also a value indicating a deviation between the measured normal V of the measurement point Wp and the optical axis O of the two-dimensional camera 310. The discrepancy value is indicated by, for example, a vector ($\Delta N$) or the like. Specifically, the discrepancy value calculation unit 1330 (see FIG. 9) included in the functional configuration of the normal correction unit 133 calculates the discrepancy value ($\Delta N$) from the position and the direction of the two-dimensional camera 310 and the measured normal V (the actually measured value) of the normal Wp of the measurement point Wp. Here, in the first embodiment, the direction ($\theta c_2$) of the measurement point Wp in the two-dimensional image is a rotation angle around the normal serving as the axis. Therefore, the normal vector of the measurement point Wp in the global coordinate system converted by the conversion unit 139 matches the determined normal vector of the measurement point. That is, the deviation between the normal V (the actually measured value) of the measurement point Wp and the determined normal (the defined value) of the measurement point is not a deviation caused by mismatch of the normal vector, but a deviation caused by mismatch of the position coordinates of the measurement point Wp.

In step S407, the CPU 130 determines whether or not the discrepancy value is equal to or smaller than a predetermined first threshold value. When the discrepancy value is not equal to or smaller than the first threshold value (NO in step S407), the CPU 130 switches the control to step S408.

In step S408, the CPU 130 calculates the amount of correction from the discrepancy value. Specifically, the amount-of-correction calculation unit 1332 (see FIG. 9) included in the functional configuration of the normal correction unit 133 determines the amount of correction ($\Delta X$, $\Delta Y$, $\Delta Z$, $\Delta \theta x$, $\Delta \theta y$, $\Delta \theta z$) for moving the two-dimensional camera 310 based on the discrepancy value ($\Delta N$). Accordingly, the amount of correction necessary for matching the optical axis O of the two-dimensional camera 310 with the measured normal V (the actually measured value) of the measurement point Wp is calculated.

In step S409, the CPU 130 determines the position and the direction of the two-dimensional camera 310 from the amount of correction. Specifically, the amount-of-correction calculation unit 1332 determines the position and the direction (Xw, Yw, Zw, Nw) of the two-dimensional camera 310 from the calculated the amount of correction and the position and the direction of the two-dimensional camera 310 instructed by the position determination unit 131 in step S403. In this case, the updating unit 1331 included in the functional configuration of the normal correction unit 133 corrects the position of the measurement point Wp stored in the first storage unit 142 based on the amount of correction, and updates the information in the first storage unit 142 with the position of the corrected measurement point Wp. Accordingly, the measured normal V (the actually measured value) of the measurement point Wp is stored in the first storage unit 142 as the determined normal V (an instructed value) of the measurement point Wp.

The CPU 130 repeats steps S403 to S409 until the discrepancy value becomes equal to or smaller than the first threshold value (YES in step S407). When the discrepancy value is equal to or smaller than the first threshold value (YES in step S407), the CPU 130 switches the control to step S410.

In step S410, the CPU 130 determines the normal V of the measurement point Wp after the correction. More specifically, in step S409, the information of the first storage unit 142 updated by the updating unit 1331 is determined as the position and the normal vector of the measurement point Wp after the correction.

As described above, the specifying unit 431 included in the image processing device 2 of the image processing system SYS searches for the image region similar to the CAD model for recognition stored in the storage unit 432 in the three-dimensional image captured by the three-dimensional camera 410. The path generation unit 132 included in the image processing device 2 of the image processing system SYS converts the information obtained from the image region searched for by the specifying unit 431 and the coordinates (Xmi, Ymi, Zmi) and the normal vector (Nmi) of each measurement point Wp on the 3D CAD stored in the storage unit 141 into the coordinates (Xwi, Ywi, Zwi) and the normal vector (Nwi) in the global work coordinate system. As a result, the specifying unit 431 determines the normal V with respect to each measurement point Wp set in the workpiece W.

Further, in the image processing system SYS, in the two-dimensional image captured by the two-dimensional camera 310 in a state in which the two-dimensional camera 310 is positioned on the normal V determined by the specifying unit 431, the specifying unit 331 searches for an image region similar to the reference model image stored in the storage unit 334. The normal correction unit 133 included in the image processing device 2 of the image processing system SYS corrects the normal V determined by the specifying unit 431 to determine the normal V based on the information obtained from the image region searched for by the specifying unit 331.

That is, in the image processing system SYS according to the first embodiment, the normal V with respect to each measurement point Wp set in the workpiece W is determined based on the information obtained from the three-dimensional image, and then, is corrected based on information obtained from the two-dimensional image. That is, it is possible to correct a deviation between the optical axis O of the two-dimensional camera 310 and the normal V with respect to the measurement point Wp, which is caused by a control error of the robot 210, based on the information obtained from the two-dimensional image. Further, a deviation between the optical axis O of the two-dimensional camera 310 and the normal V with respect to the measurement point Wp, which is caused by an error between the CAD model of the workpiece W and the workpiece W provided by the line L, can be corrected based on the information obtained from the two-dimensional image. Therefore, by using the image processing system SYS according to the first embodiment, it is possible to adjust the positional relationship between the two-dimensional camera 310 and the workpiece W more accurately.

Note that, in the first embodiment, the direction ($\theta c_2$) of the measurement point Wp in the two-dimensional image is assumed to be the angle of rotation around the normal serving as an axis. However, the two-dimensional image processing device 300 may search for an image region similar to the reference model image, and obtain an angle between a plane on which the measurement point Wp is located and the surface on which the workpiece W is installed from distortion of the image within the image region obtained as a result of the search. In such a case, the CPU 130 can also detect a deviation of the normal vector.

H. Focus Adjustment Process

Figure 10:
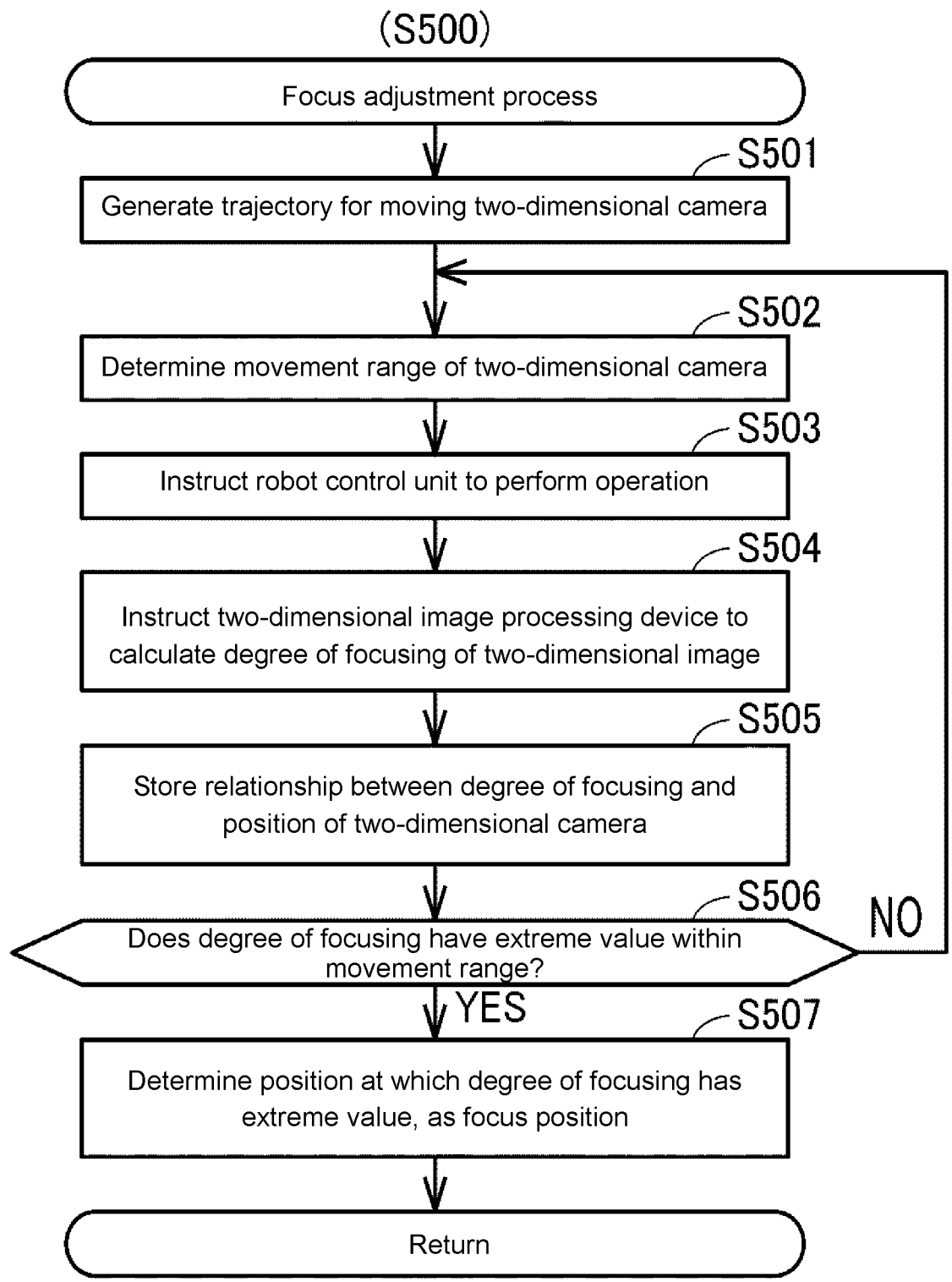
FIG. 10 is a flowchart of a focus adjustment process.
Figure 11:
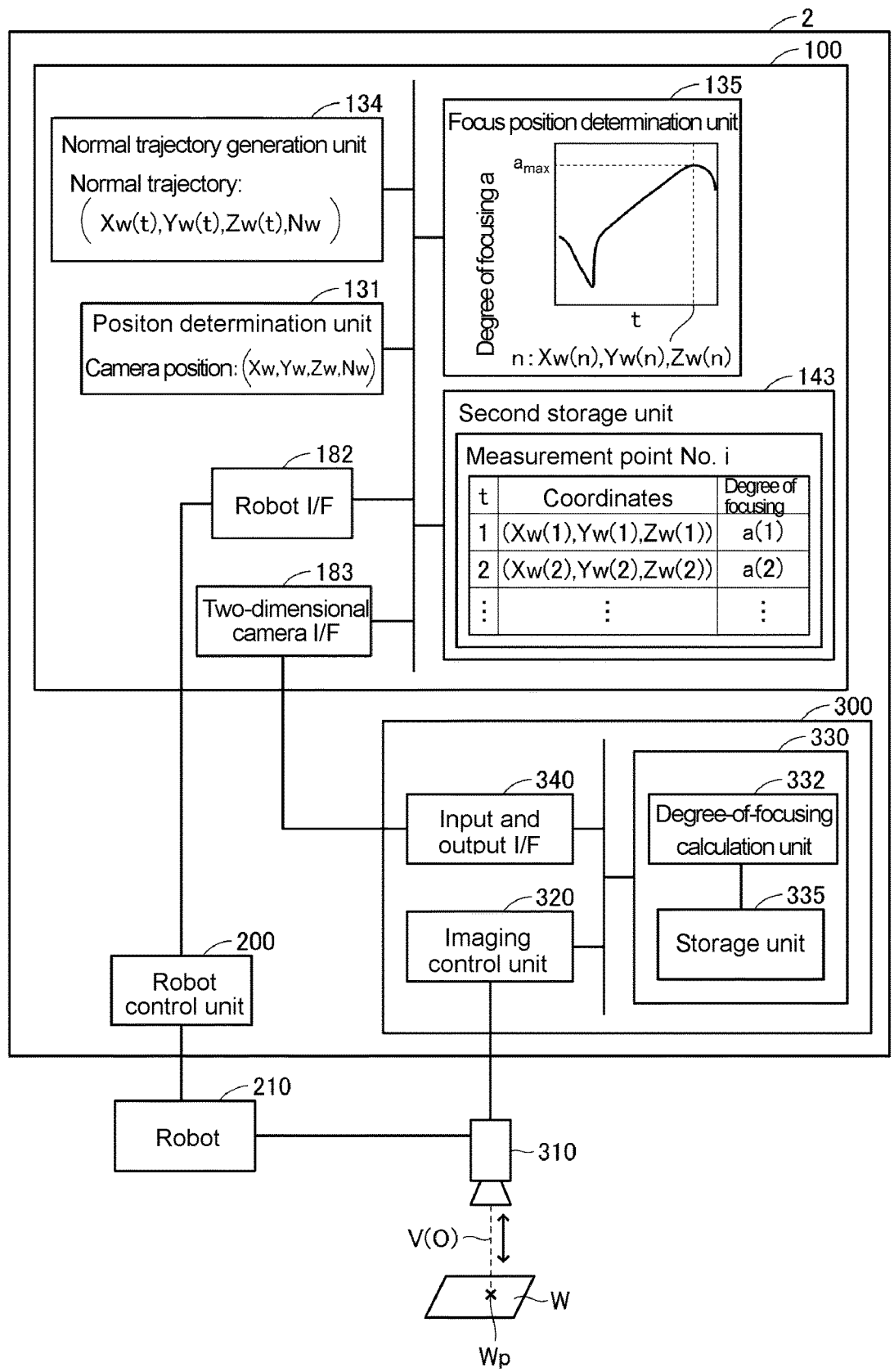
FIG. 11 is a schematic diagram illustrating a functional configuration of a focus adjustment system.

The focus position adjustment process (step S500; see FIG. 4) that is executed by the CPU 130 of the management device 100 will be described in detail with reference to FIG. 10 and FIG. 11. FIG. 10 is a flowchart of the focus position adjustment process. FIG. 11 is a diagram illustrating an example of a functional configuration of the image processing device 2 that functions in execution of the focus position adjustment process. In FIG. 11, a shape of the workpiece W is simplified and described as compared with FIGS. 1 and 3.

In step S501, the CPU 130 generates a trajectory for moving the two-dimensional camera 310. More specifically, the normal trajectory generation unit 134 generates a normal trajectory (Xw(t), Yw(t), Zw(t), Nw) of the two-dimensional camera 310 obtained by changing the distance between the two-dimensional camera 310 and the measurement point Wp in a state in which the corrected normal V determined in the normal correction process (step S400) is matched with the optical axis O of the two-dimensional camera 310.

In step S502, the CPU 130 determines a movement range of the two-dimensional camera 310. The movement range has a determined initial value, and gradually changes by repeating steps S502 to S506. Specifically, the movement range is determined from the relationship between the degree of focusing a obtained in step S505 and the position of the two-dimensional camera 310, such that the two-dimensional camera 310 moves in a direction in which the degree of focusing a increases.

In step S503, the CPU 130 instructs the robot control unit 200 to move the two-dimensional camera 310. More specifically, the CPU 130 instructs the robot control unit 200 to move the two-dimensional camera 310 at a constant speed on the trajectory of step S501 within the movement range determined in step S502. Here, the speed at which the two-dimensional camera 310 is moved is a speed at which the distance by which the two-dimensional camera 310 moves in a time required for performance of one imaging becomes equal to or smaller than a depth of focus of the two-dimensional camera 310.

In step S504, the CPU 130 instructs the two-dimensional image processing device 300 to calculate the degree of focusing a. Specifically, in step S503, the CPU 130 instructs the two-dimensional image processing device 300 to calculate the degree of focusing a of the two-dimensional camera 310 from the two-dimensional image captured by the two-dimensional camera 310 in a first period in which the two-dimensional camera 310 is moving within the movement range instructed to the robot control unit 200 by the CPU 130.

A method of calculating the degree of focusing a that is executed by the two-dimensional image processing device 300 will be described with reference to FIG. 11. The degree-of-focusing calculation unit 332 of the two-dimensional image processing device 300 receives a command to calculate the degree of focusing a, and instructs the imaging control unit 320 to acquire the two-dimensional image captured during the first period. The imaging control unit 320 stores the acquired two-dimensional image in the storage unit 335 of the image processing engine 330. The degree-of-focusing calculation unit 332 performs predetermined image processing on the two-dimensional image to calculate the degree of focusing a of the two-dimensional image stored in the storage unit 335. For example, a density deviation of the two-dimensional image may be used as a feature amount regarding the degree of focusing a, and a calculated density deviation may be set as the degree of focusing a. The degree-of-focusing calculation unit 332 transmits a relationship a(t) between the calculated degree of focusing a and a time t at which the two-dimensional camera 310 has captured the two-dimensional image to the focus position determination unit 135.

Referring back to FIG. 10, the focus adjustment process will be described. The CPU 130 receives the relationship a(t) between the degree of focusing a and the time t at which the two-dimensional camera 310 has captured the two-dimensional image from the two-dimensional image processing device 300, and stores a relationship between the degree of focusing a and the position of the camera 310 in step S505. Specifically, the CPU 130 specifies the position of the two-dimensional camera 310 at the imaging time t from, for example, the movement range of the two-dimensional camera 310 instructed in step S503. A relationship between the specified position (Xw(t), Yw(t), Zw(t)) of the two-dimensional camera 310 and the degree of focusing a(t) is stored in the second storage unit 143.

In step S506, the CPU 130 determines whether or not the degree of focusing a has an extreme value within the movement range. When the degree of focusing a does not have the extreme value within the movement range (NO in step S506), the CPU 130 repeats steps S502 to S506 until the degree of focusing a has the extreme value within the movement range. Here, when the CPU 130 determines the movement range in step S502, the CPU 130 sets a start position of the two-dimensional camera 310 at a position away from the workpiece W or causes the start position to be close to the workpiece W and searches for a position at which the degree of focusing a has an extreme value. Note that when the start position of the two-dimensional camera 310 is set to a position close to the workpiece W, the position is set such that the workpiece W does not come into contact with the two-dimensional camera 310 and the robot 210.

When the degree of focusing a has an extreme value within the movement range (YES in step S506), the CPU 130 switches the control to step S507.

In step S507, the position at which the degree of focusing a has an extreme value is determined as the focus position, and the process returns to the inspection process. Specifically, the focus position determination unit 135 determines the position of the two-dimensional camera 310 when the two-dimensional camera 310 captures the two-dimensional image in which the highest degree of focusing $a_{max}$ among the degrees of focusing a stored in the storage unit is obtained, to be the focus position (Xw, Yw, Zw) (see FIG. 11).

Thus, by the CPU 130 performing the focus adjustment process, a process of focusing the two-dimensional camera 310 on the measurement point Wp on the determined normal V is performed.

I. Inspection Execution Process

Figure 12:
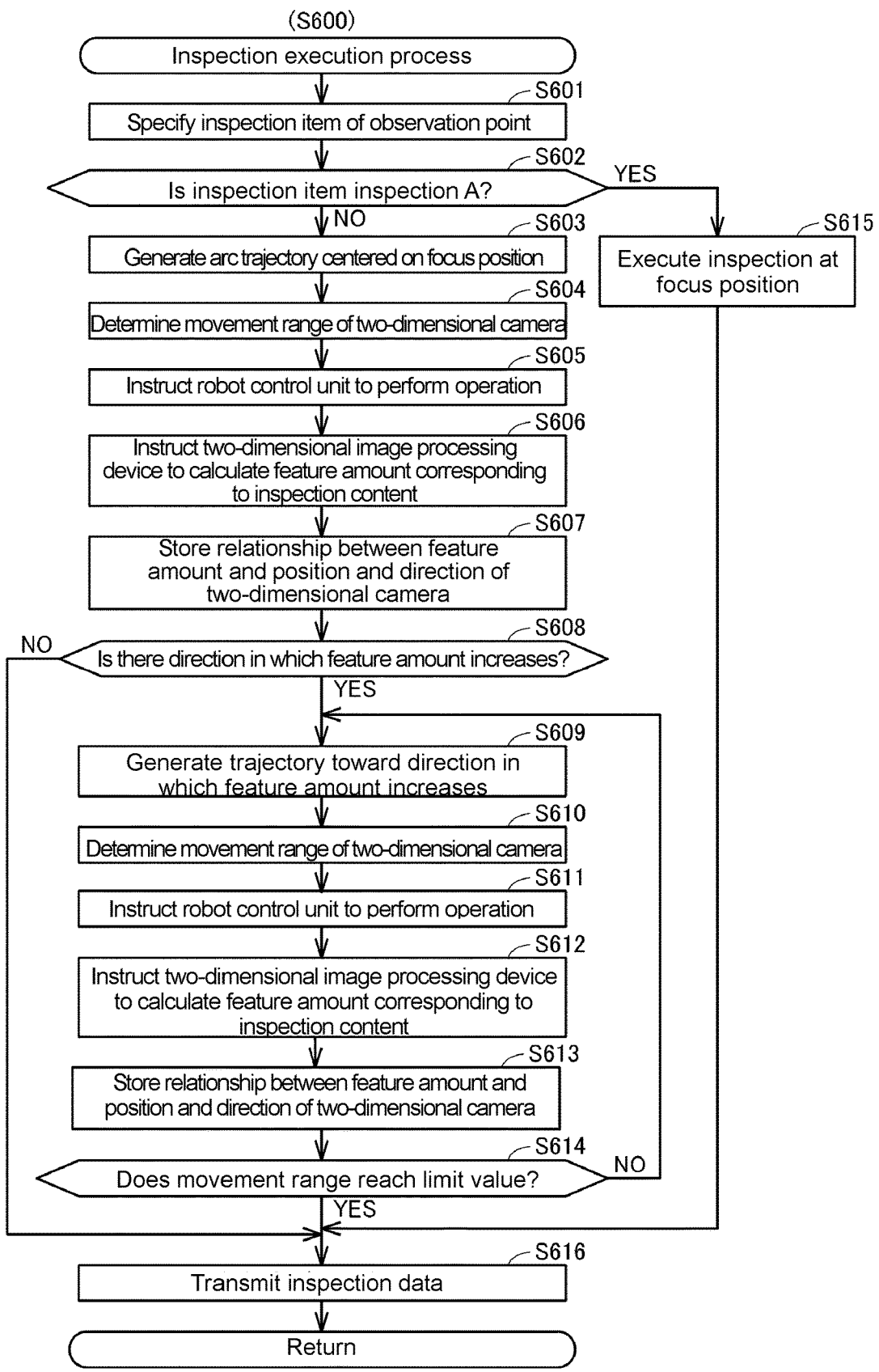
FIG. 12 is a flowchart of an inspection execution process.
Figure 13:
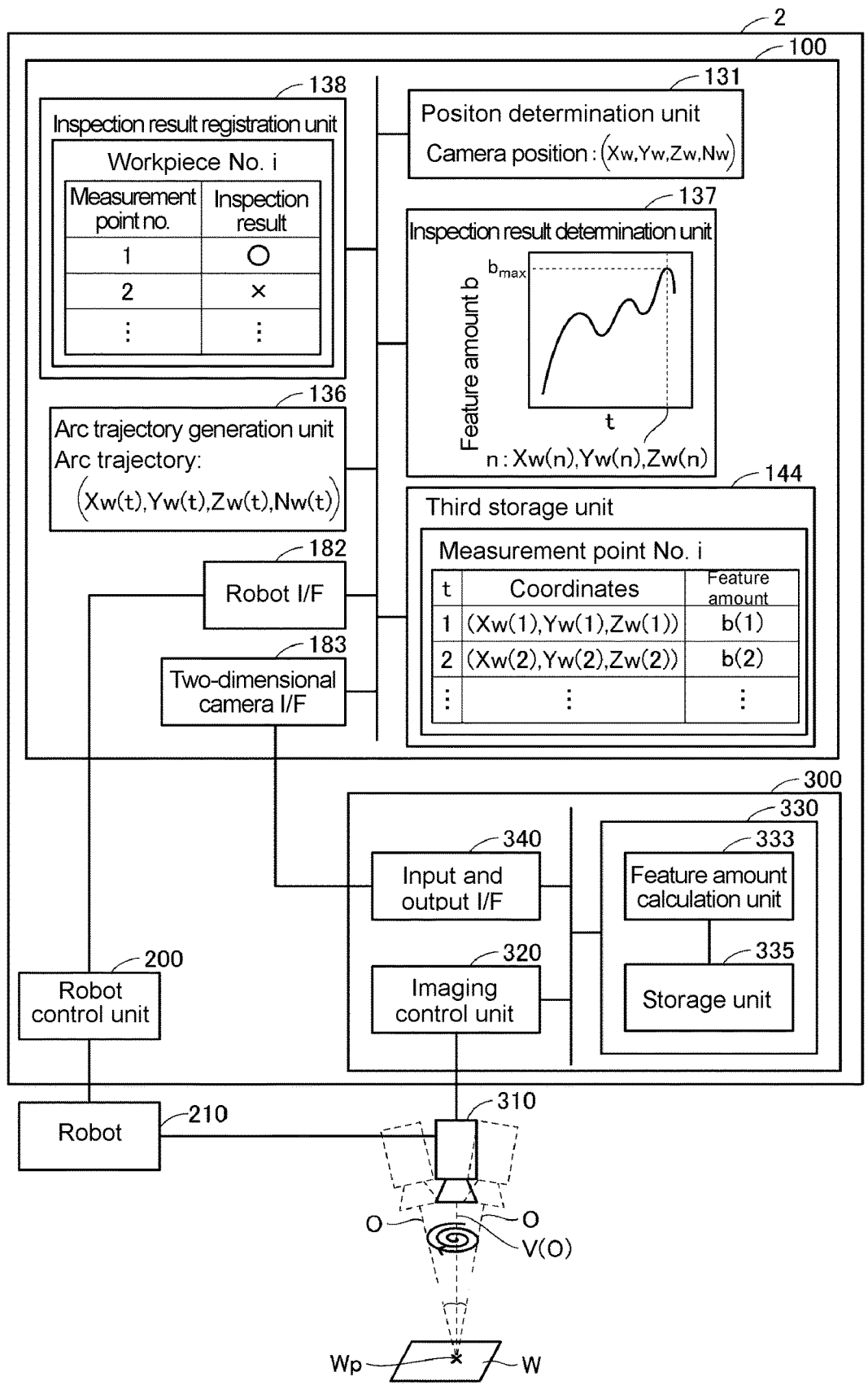
FIG. 13 is a schematic diagram illustrating a functional configuration of an inspection execution system.
Figure 14A:
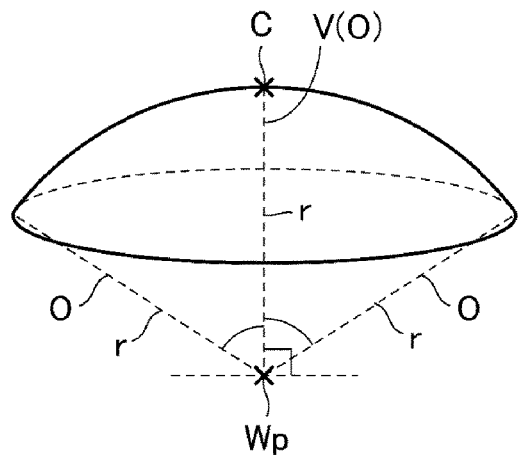
FIG. 14A, FIG. 14B and FIG. 14C are diagrams illustrating an example of an arc trajectory of a camera.
Figure 14B:
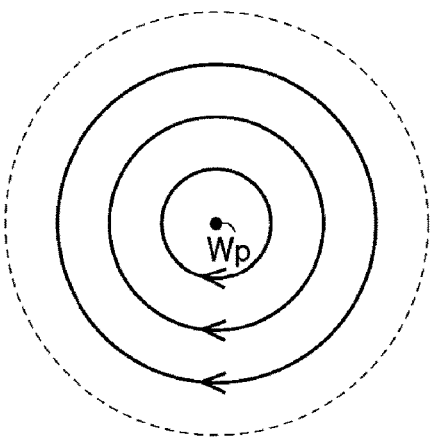
Figure 14C:
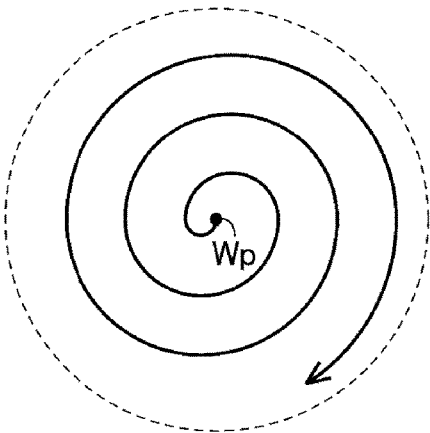

The inspection execution process (step S600; see FIG. 4) that is executed by the CPU 130 of the management device 100 will be described in detail with reference to FIGS. 12 to 14. FIG. 12 is a flowchart of inspection execution process. FIG. 13 is a diagram illustrating an example of the functional configuration of the image processing device 2 that functions in execution of the inspection execution process. FIG. 14A, FIG. 14B and FIG. 14C are views illustrating an example of the arc trajectory of the two-dimensional camera 310. In FIG. 13, a shape of the workpiece W is simplified and described as compared with FIGS. 1 and 3.

In step S601, the CPU 130 specifies an inspection item of the measurement point. Specifically, the CPU 130 specifies the inspection item based on a correspondence relationship between the measurement point Wp stored in the first storage unit 142 and the inspection item.

In step S602, the CPU 130 determines whether or not the inspection item is an inspection A. Here, the inspection A refers to an inspection in which there is concern that an inspection result may change according to a direction in which the two-dimensional camera 310 performs imaging, such as whether or not correct printing on a surface of the workpiece W has been performed. When the inspection item is the inspection A (YES in step S602), the CPU 130 switches the control to step S615.

In step S615, the CPU 130 executes the inspection at the focus position. Specifically, the inspection result determination unit 137 executes the inspection A at the focus position determined in the focus position adjustment process (step S500).

When the inspection item is not the inspection A (NO in step S602), the CPU 130 generates an arc trajectory centered on the focus position in step S603. Specifically, in a state in which the arc trajectory generation unit 136 maintains the distance between the position of the two-dimensional camera 310 determined by the focus position determination unit 135 and the measurement point Wp, the arc trajectory generation unit 136 generates the arc trajectory (Xw(t), Yw(t), Zw(t), Nw(t)) so that an angle between the normal V with respect to the measurement point Wp and the optical axis O of the two-dimensional camera 310 changes from 0 to a predetermined value. Here, the arc trajectory will be described with reference to FIG. 14A, FIG. 14B and FIG. 14C. As illustrated in FIG. 14A, the arc trajectory generation unit 136 generates an arc trajectory so that the dimensional camera 310 is located on a surface of a sphere having a radius r that is a distance between a position C of the two-dimensional camera 310 determined by the focus position determination unit 135 and the measurement point Wp. As illustrated in FIG. 14B, the arc trajectory may be a trajectory that repeats traveling around the measurement point Wp again with a changed angle between the optical axis O of the two-dimensional camera 310 and the normal V after traveling around the measurement point Wp once with a constant angle between the optical axis O of the two-dimensional camera 310 and the normal V. Further, as illustrated in FIG. 14C, the arc trajectory may be a trajectory that spirally moves around the measurement point Wp while gradually changing the angle between the optical axis O of the two-dimensional camera 310 and the normal V.

Referring back to FIG. 12, the inspection execution process will be described. In step S604, the CPU 130 determines the movement range of the two-dimensional camera 310. The movement range is, for example, a range that surrounds the measurement point Wp at least once.

In step S605, the CPU 130 instructs the robot control unit 200 to move the two-dimensional camera 310. Specifically, the CPU 130 instructs the robot control unit 200 to move the two-dimensional camera 310 at a constant speed on the trajectory of step S601 within the movement range determined in step S604.

In step S606, the CPU 130 instructs the two-dimensional image processing device 300 to calculate the feature amount b corresponding to the inspection content. Specifically, in step S605, the CPU 130 instructs the two-dimensional image processing device 300 to calculate the feature amount b determined in advance for each inspection content from the two-dimensional image captured by the two-dimensional camera 310 in the second period in which the two-dimensional camera 310 is moving within the movement range instructed to the robot control unit 200 by the CPU 130.

A method of calculating the feature amount b that is executed by the two-dimensional image processing device 300 will be described with reference to FIG. 13. The feature amount calculation unit 333 of the two-dimensional image processing device 300 receives a command to calculate the feature amount b, and instructs the imaging control unit 320 to acquire the two-dimensional image captured during the second period. The imaging control unit 320 stores the acquired two-dimensional image in the storage unit 335 of the image processing engine 330. The feature amount calculation unit 333 executes predetermined image processing on the two-dimensional image to calculate the feature amount b of the two-dimensional image stored in the storage unit 335. The feature amount calculation unit 333 transmits the relationship b(t) between the calculated feature amount b and the time t at which the two-dimensional camera 310 has captured the two-dimensional image to the inspection result determination unit 137.

The feature amount b is an amount serving as an index for determining whether or not there is an abnormality in an appearance in appearance inspection. For example, when a scratch inspection is performed on the workpiece W on which a specific pattern such as a stripe pattern is applied to the appearance, the feature amount calculation unit 333 executes a process of removing a specific pattern for the two-dimensional image and then executes a labeling process for specifying a region indicating a defect. Accordingly, the feature amount calculation unit 333 calculates a defect area or a defect length as the feature amount b. Note that the feature amount b may be calculated using another method.

For example, the feature amount calculation unit 333 may divide the two-dimensional image into a plurality of regions, calculate a degree of defect from a color difference between the adjacent regions, execute a labeling process to specify a region in which a degree of the defect is equal to or greater than a defined value, and calculate the defect area or the defect length as the feature amount b from the region. This method is typically a method that is used for the purpose of detection of fine scratches.

Note that the feature amount calculation unit 333 may calculate the feature amount b using the following method. The feature amount calculation unit 333 performs a known edge extraction process on the two-dimensional image and then performs a known expansion process. The feature amount calculation unit 333 calculates the defect area or the defect length as the feature amount b by executing a labeling process for specifying a region indicating a defect after the expansion process. This method is typically a method used for the purpose of detection of an indentation, a dent, and the like.

Note that the method of calculating the feature amount b is not limited to the disclosed method as long as the method is a method of extracting an amount serving as an index for determining whether or not there is an abnormality in the appearance in the appearance inspection.

Referring back to FIG. 12, the inspection execution process will be described. The CPU 130 receives the relationship b(t) between the feature amount b and the time t at which the two-dimensional camera 310 has captured the two-dimensional image from the two-dimensional image processing device 300, and stores a relationship between the feature amount b and the position of the two-dimensional camera 310 in step S607. Specifically, the CPU 130 specifies the position and the direction of the two-dimensional camera 310 at the imaging time t from, for example, the movement range of the two-dimensional camera 310 instructed in step S505. The relationship between the specified position and the specified direction (Xw(t), Yw(t), Zw(t), Nw(t)) of the two-dimensional camera 310 and the degree of focusing a(t) is stored in the third storage unit 144.

In step S608, the CPU 130 determines whether or not there is a direction in which the feature amount b increases. Specifically, the CPU 130 specifies a maximum value and a minimum value of the feature amount b within the movement range, and performs the determination based on whether or not a difference between the maximum value and the minimum value is equal to or greater than a third threshold value. When the difference between the maximum value and the minimum value is equal to or greater than the third threshold value, the CPU 130 determines that there is the direction in which the feature amount b increases, in which a direction from a position at which the feature amount b becomes the minimum value and to a position at which the feature amount b becomes the maximum value is set as a direction in which the feature amount b increases.

When there is no direction in which the feature amount b increases (NO in step S608), the CPU 130 switches the control to step S616.

When there is the direction in which the feature amount b increases (YES in step S609), the CPU 130 generates a trajectory toward the direction in which the feature amount b increases in step S609. Specifically, the CPU 130 determines the direction in which the feature amount b increases, from the information on the position and the direction of the two-dimensional camera 310 stored in the third storage unit 144, and the feature amount b, and generates a trajectory toward direction.

In step S610, the CPU 130 determines the movement range of the two-dimensional camera 310. Specifically, the CPU 130 determines the movement range in the direction in which the feature amount b increases.

In step S611, the CPU 130 instructs the robot control unit 200 to move the two-dimensional camera 310. Specifically, the CPU 130 instructs the robot control unit 200 to move the two-dimensional camera 310 at a constant speed on the trajectory of step S609 within the movement range determined in step S610.

In step S612, the CPU 130 instructs the two-dimensional image processing device 300 to calculate the feature amount b corresponding to the inspection content.

In step S613, the CPU 130 stores the relationship between the feature amount b and the position of the two-dimensional camera 310.

In step S614, the CPU 130 determines whether or not the movement range reaches a limit value. Specifically, the CPU 130 determines whether or not the two-dimensional camera 310 can be moved in the increasing direction. The position determination unit 131 determines whether the two-dimensional camera 310 can be moved in the increasing direction according to whether the two-dimensional camera 310 and/or the robot 210 does not come in contact with the workpiece W or according to an operation limit of the robot 210. When the movement range does not reach the limit value (NO in step S614), the CPU 130 repeats steps S609 to S614 until the movement range reaches the limit value.

When the movement range reaches the limit value (YES in step S614) and when there is no direction in which the feature amount b increases (NO in step S608), the CPU 130 executes the inspection at the focus position (after the execution of step S615) and then transmits the inspection data in step S616. Specifically, the CPU 130 transmits an inspection result to the inspection result registration unit 138 to register the inspection result. When there is no direction in which the feature amount b increases (NO in step S608), the CPU 130 calculates a maximum value of the feature amount b stored in the third storage unit 144, and determines whether or not the calculated maximum value is equal to or smaller than a defined value. When the calculated maximum value is equal to or smaller than the defined value, the CPU 130 determines that there is no abnormality and registers No Abnormality (a circle in FIG. 13) as the inspection result. When the calculated maximum value is greater than the defined value, the CPU 130 determines that there is an abnormality and registers Abnormality (a cross mark in FIG. 13) as the inspection result. When the movement range reaches the limit value (YES in step S614), the CPU 130 specifies the highest feature amount $b_{max}$ among the feature amounts b stored in the third storage unit 144 (see FIG. 13), and determines whether or not the feature amount $b_{max}$ is equal to or smaller than the defined value. When the feature amount $b_{max}$ is equal to or smaller than the defined value, the CPU 130 determines that there is no abnormality and registers the inspection result. When the feature amount $b_{max}$ is greater than the defined value, the CPU 130 determines that there is an abnormality and registers the inspection result. After the CPU 130 executes the inspection at the focus position (after the execution of step S615), the CPU 130 registers the inspection result at the focus position. For example, the inspection result determination unit 137 instructs the two-dimensional image processing device 300 to calculate a degree of matching between the two-dimensional image obtained at the focus position and the two-dimensional image serving as a reference, and determines whether or not there is an abnormality according to the obtained degree of matching.

Thus, in the image processing system SYS according to the first embodiment, the arc trajectory generation unit 136 generates an arc trajectory so that an angle formed between the normal V with respect to the measurement point Wp and the optical axis O of the two-dimensional camera 310 changes from 0 to a predetermined value in a state in which the distance between the two-dimensional camera 310 and the measurement point Wp is maintained. The CPU 130 instructs the robot control unit 200 to move the two-dimensional camera 310 on the arc trajectory generated by the arc trajectory generation unit 136. Further, the inspection result determination unit 137 determines the movement range of the two-dimensional camera 310 based on the change in the feature amount b according to the change in the angle formed between the normal V and the optical axis O. That is, the inspection result determination unit 137 determines a relative positional relationship between the two-dimensional camera 310 and the workpiece W based on the change in the feature amount b according to the change in the angle formed between the normal V and the optical axis O.

Since the inspection result determination unit 137 determines the positional relationship between the two-dimensional camera 310 and the workpiece W based on the feature amount b, it is possible to execute the inspection at an optimal position in calculating the feature amount b. That is, by using the image processing system SYS according to the embodiment, it is possible to perform the inspection at a position at which halation due to a state in which light hits the workpiece W hardly occurs. Note that the feature value b in the embodiment may be a density deviation that the degree-of-focusing calculation unit 332 calculates as the degree of focusing a. That is, the feature amount calculation unit 333 and the degree-of-focusing calculation unit 332 may be integrated.

J. Method of Registering Inspection Path Using Input Device

Figure 15A:
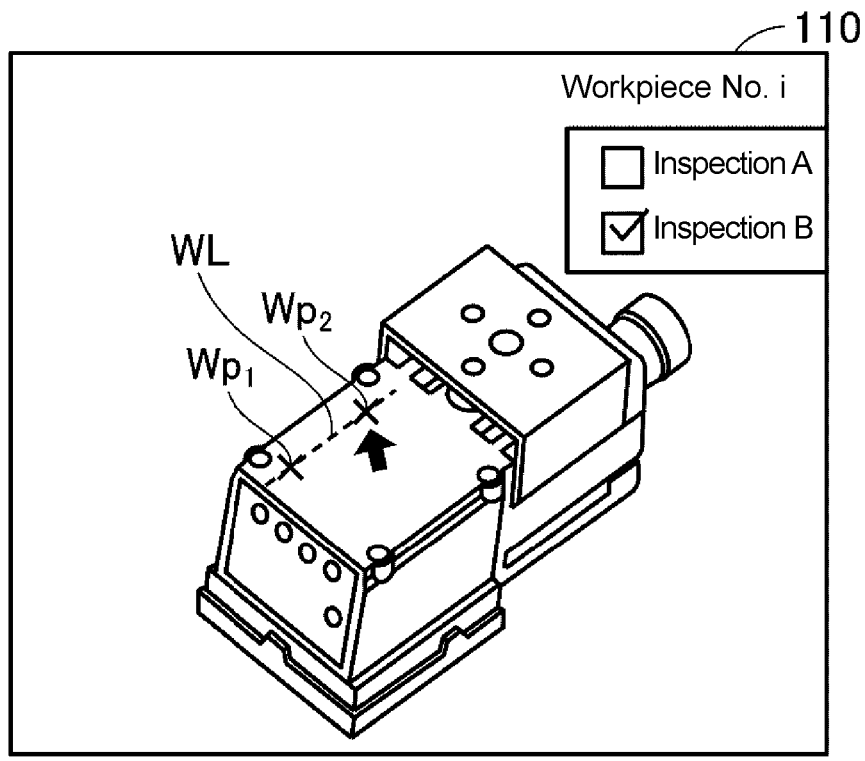
FIG. 15A and FIG. 15B are diagrams illustrating an example of a process when a user inputs an inspection path using an input device.
Figure 15B:
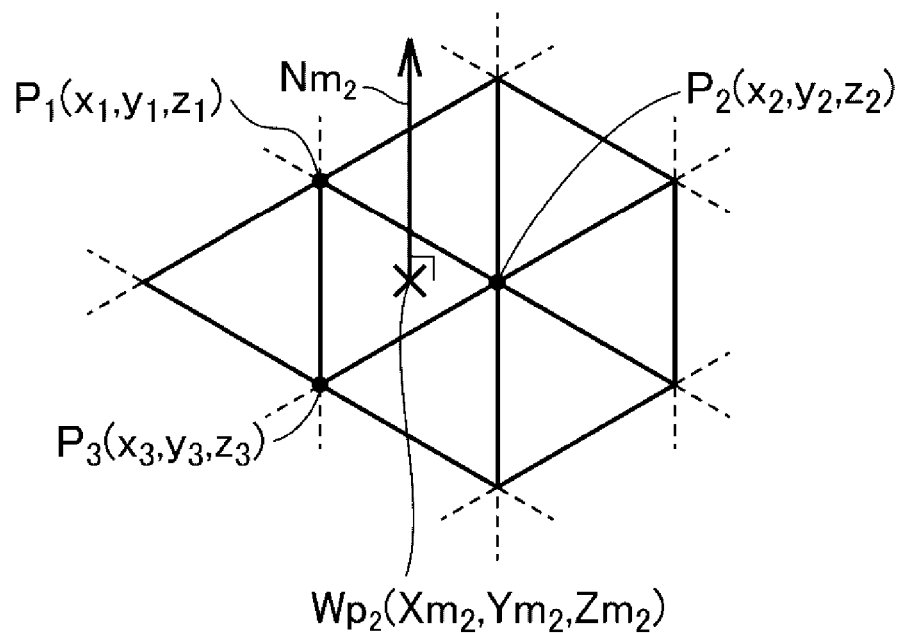

A method of registering an inspection path WL using an input device will be described with reference to FIG. 15A and FIG. 15B. FIG. 15A and FIG. 15B are diagrams illustrating an example of a process when the user has input the inspection path WL using the input device 120. FIG. 15A illustrates an example of a screen that is displayed on the display device 110 when a user has input a path using the input device 120. FIG. 15B is a diagram illustrating a method of creating a normal vector.

As illustrated in FIG. 15A, the user places a cursor on a 3D CAD model of the workpiece displayed on the display device 110, and selects a measurement point and an item to be inspected at an inspection place. When the measurement point is selected, a normal with respect to the measurement point is created using the method illustrated in FIG. 15B. The CPU 130 of the management device 100 creates a normal vector based on the 3D CAD data of the workpiece. Specifically, the CPU 130 specifies a micro-plane surrounded by P1(x1, y1, z1), P2(x2, y2, z2) and P3(x3, y3, z3) at which the measurement point Wp2 is located. The CPU 130 calculates a vector perpendicular to the micro-plane as a normal vector $Nm_2$ based on the identified micro-plane.

The CPU 130 registers information that the user has registered using the input device 120, in the storage unit 141. Accordingly, the inspection information 1411 is stored in the storage unit 141.

Thus, the image processing device 2 of the image processing system SYS in the first embodiment displays the 3D CAD model of the workpiece, which is design information of the workpiece W, on the display device 110 and sets the measurement point Wp according to a user operation. Therefore, in the image processing system SYS according to the first embodiment, a degree of freedom in setting the measurement point Wp is high.

Further, the image processing device 2 of the image processing system SYS in the first embodiment can calculate the normal V with respect to each of the measurement points Wp set according to the user operation. Therefore, the user can execute an accurate inspection by setting the measurement point Wp and instructing the start of the inspection, and convenience of a user using the image processing system SYS is improved.

Second Embodiment

In the first embodiment, when the normal with respect to each measurement point Wp of the workpiece W is determined, the management device 100 determines the normal upon generating the path based on the three-dimensional image, and then, corrects the normal V determined for each measurement point Wp based on the two-dimensional image. However, the two-dimensional camera 310 may not be used. Specifically, through the path generation process described with reference to FIGS. 6 and 7, the coordinate position of each measurement point Wp on the 3D CAD of each measurement point and the normal vector for each measurement point Wp may be converted into the global coordinate system, and the coordinate position of the measurement point Wp and the normal vector for the measurement point Wp in the global coordinate system may be calculated to determine the normal vector V of the measurement point Wp. In this case, the management device 100 executes the focus position adjustment process (step S500) without executing the normal correction process (step S400) illustrated in FIG. 8.

Figure 16:
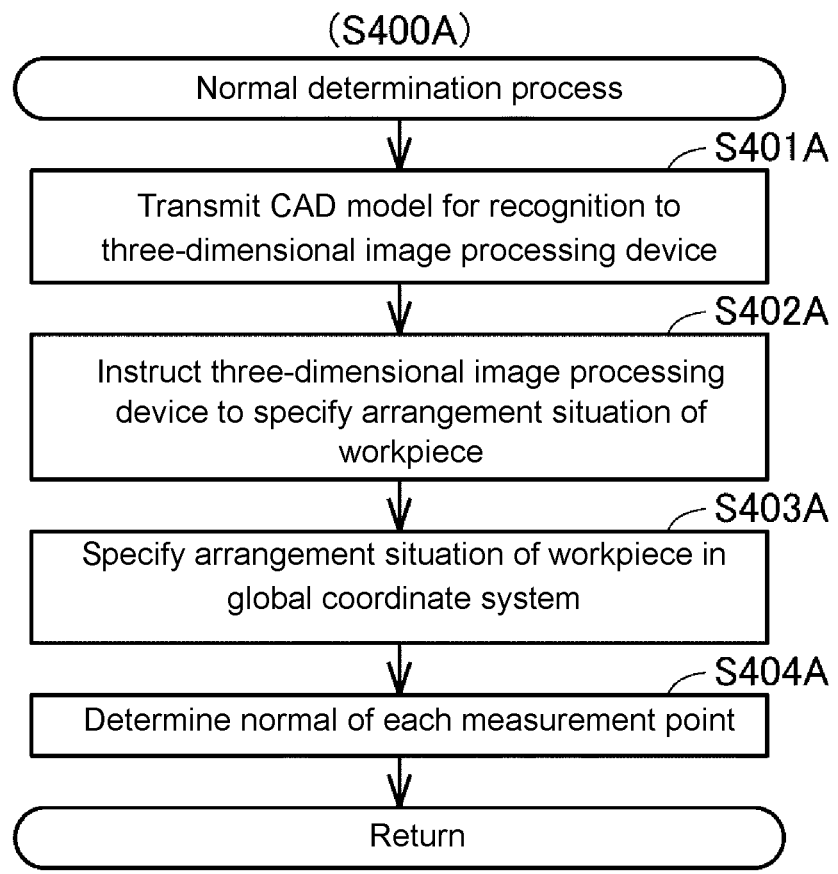
FIG. 16 is a flowchart of a normal determination process according to a second embodiment.

For example, the normal determination process (step S400A) illustrated in FIG. 16 may be executed instead of the path generation process (step S200) and the normal correction process (step S400) in the first embodiment. FIG. 16 is a flowchart of the normal determination process according to the second embodiment.

In step S401A, the CPU 130 sends the CAD model for recognition of the inspection information 1411 specified in the three-dimensional image processing device 400.

In step S402A, the CPU 130 instructs the three-dimensional image processing device 400 to specify the arrangement situation of the workpiece W.

In step S403A, the CPU 130 specifies the arrangement situation of the workpiece W in the global coordinate system.

In step S404A, the CPU 130 determines the normal of the measurement point Wp. Specifically, the CPU 130 converts the coordinates (Xmi, Ymi, Zmi) and the normal vector (Nmi) of the measurement point Wp among the inspection information stored in the storage unit 141 into the coordinate value (Xwi, Ywi, Zwi) and the normal vector (Nwi) of a global workpiece coordinate system based on the position (Xw, Yw, Zw) and the direction (θxw, θyw, θzi) of the workpiece W in the global coordinate system, and a predetermined conversion equation, and determines the normal V of each measurement point Wp. The path generation unit 132 updates the inspection information 1411 of the storage unit 141 with the coordinate value and the normal vector in the global coordinate system, and stores the inspection information in the first storage unit 142 (see FIG. 9).

Here, in step S501 of the focus adjustment process in the second embodiment, the trajectory of the two-dimensional camera 310 is generated based on the normal V determined in step S404A.

As described above, the specifying unit 431 included in the image processing device 2 of the image processing system SYS according to the second embodiment can search for an image region similar to the CAD model for recognition stored in the storage unit 432 in the three-dimensional image captured by the three-dimensional camera 410. The path generation unit 132 included in the image processing device 2 of the image processing system SYS converts the information obtained from the image region searched for by the specifying unit 431 and the coordinates (Xmi, Ymi, Zmi) and the normal vector (Nmi) of each measurement point on the 3D CAD stored in the storage unit 141 into the coordinates (Xwi, Ywi, Zwi) and the normal vector (Nwi) in the global work coordinate system. Accordingly, the normal V with respect to each measurement point Wp set in the workpiece W is determined. That is, in the image processing system SYS, it is possible to determine the normal V with respect to each measurement point Wp set in the workpiece W through one imaging and to rapidly determine the normal V.

Third Embodiment

Figure 17:
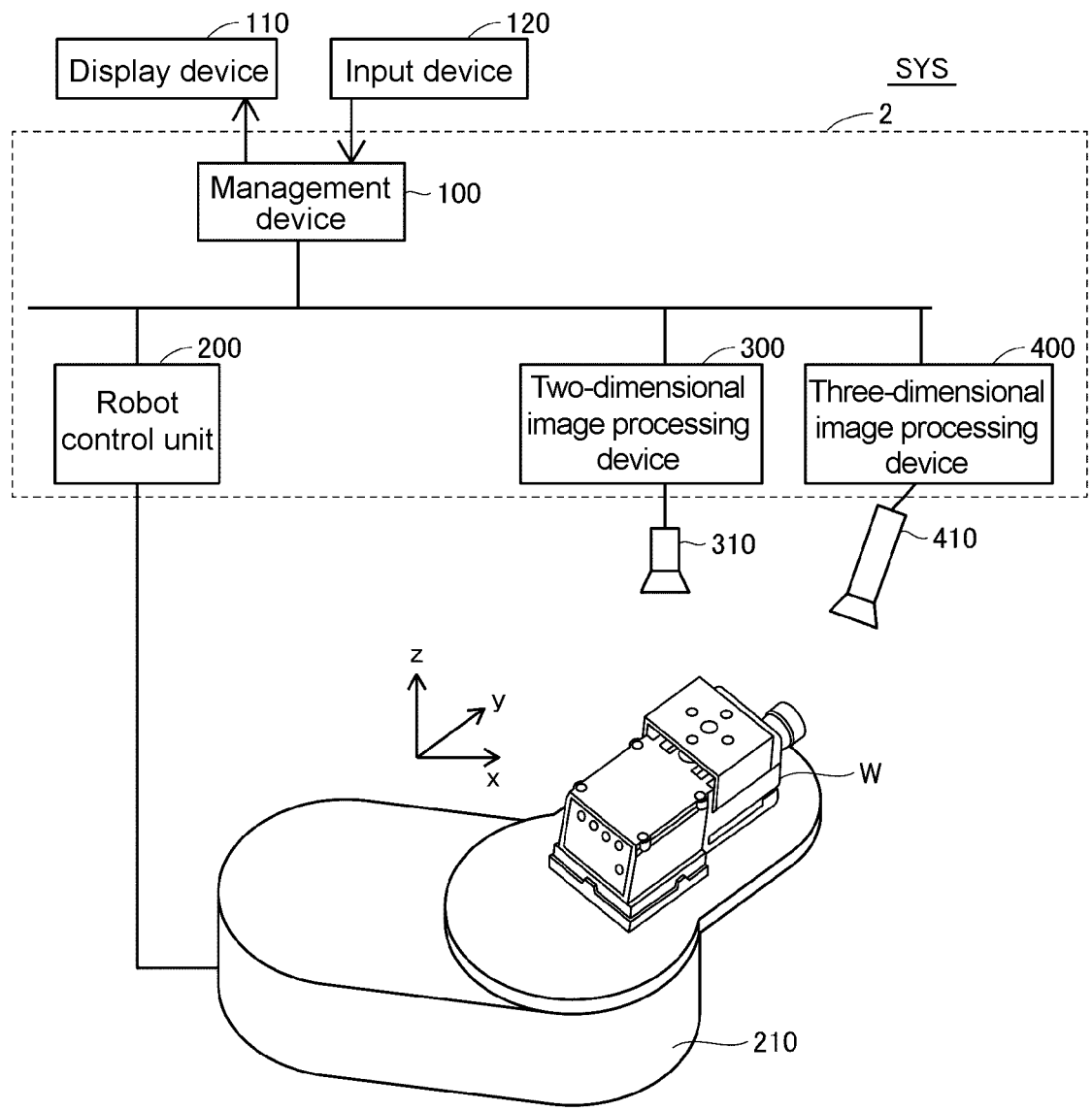
FIG. 17 is a schematic diagram illustrating a configuration of an image processing system according to a third embodiment.

In the first and second embodiments, the robot 210 changes the distance between the two-dimensional camera 310 and the workpiece W by moving the position of the two-dimensional camera 310. However, as illustrated in FIG. 17, the robot 210 may change the distance of the two-dimensional camera 310 and the workpiece W by moving the position of the workpiece W. FIG. 17 is a schematic diagram illustrating a configuration of the image processing system according to the third embodiment. Typically, the robot 210 is a SCARA type robot, and can move the workpiece W in X, Y, and Z directions (coordinate axes illustrated in FIG. 17) in the world coordinate system. Accordingly, after the two-dimensional camera 310 is matched with the normal with respect to the measurement point of the workpiece W, the two-dimensional camera 310 can be focused.

In FIG. 17, the SCARA type robot is taken as an example. However, when the workpiece W is sufficiently small, a configuration, in which not only the position of the workpiece W but also a posture thereof can be changed using an arm type robot, can be adopted. Further, when the workpiece W is sufficiently small, an operation range of the robot 210 is narrower as compared with a case in which the two-dimensional camera 310 is moved, and therefore, it is possible to rapidly move the workpiece W.

Modification Example

Camera for Inspection

In the first to third embodiments, the camera that is used for the appearance inspection is the two-dimensional camera 310. Note that a displacement sensor may be used instead of the two-dimensional camera 310. The displacement sensor includes, for example, a light cutting sensor, and an ultrasonic displacement sensor. By using the displacement sensor, it is possible to detect minute defects as, compared with the case in which a two-dimensional camera is used.

Illumination Device

In the first to third embodiments, the image processing system SYS executes the inspection at a position at which halation hardly occurs by moving the two-dimensional camera 310 along the arc trajectory. Further, the inspection can be executed in a situation where halation hardly occurs by changing the position and/or the direction of an illumination (not illustrated) for irradiating the workpiece W with light instead of the two-dimensional camera 310. That is, the arc trajectory generation unit 136 may generate a trajectory for changing the position and/or direction of the illumination, instead of generating a trajectory for changing the position and the direction of the two-dimensional camera 310.

Method of Positioning 2D Camera

In the first to third embodiments, as a method of determining a position of the two-dimensional camera 310 when the inspection is executed, the optimal position is determined as the position of the two-dimensional camera 310 when the inspection is executed by performing focusing and then changing the angle formed between the normal V and the optical axis O according to the inspection content. However, the optimal position may be determined as the position of the two-dimensional camera 310 by changing the angle formed by the normal V and the optical axis O according to the inspection content while focusing. Specifically, the two-dimensional camera 310 may be slightly moved along the normal trajectory and the angle formed between the normal V and the optical axis O may be changed at the moved position. The image processing device 2 may calculate a feature amount indicating a degree of matching between the two-dimensional image and the reference model image, and determine an angle which is an direction of the two-dimensional camera 310 among angles between the normal V and the optical axis O based on the feature amount. Thereafter, the image processing device 2 may change the distance between the workpiece W and the two-dimensional camera 310 in a state in which the determined direction of the two-dimensional camera 310 is maintained, and determine the distance from the feature amount indicating the degree of matching between the two-dimensional image and the reference model image.

Further, in the first embodiment, it is assumed that positioning of the two-dimensional camera is performed using the two-dimensional camera and the three-dimensional camera. In the second embodiment, it is assumed that positioning of the two-dimensional camera that is used for inspection is performed using only the three-dimensional camera. Each normal V with respect to each measurement point Wp set in the workpiece W may be determined using only the two-dimensional camera.

Regarding Reference Line

In the embodiment, the reference line is a perpendicular line that is a perpendicular line perpendicular to the microplane on which the measurement point Wp is located. However, the reference line may be set by the user. For example, the reference line may be a line that serves as a reference when the direction of the two-dimensional camera 310 is set, so that the workpiece located within the imaging region is located within a depth of field of the two-dimensional camera 310 as much as possible.

Figure 18A:
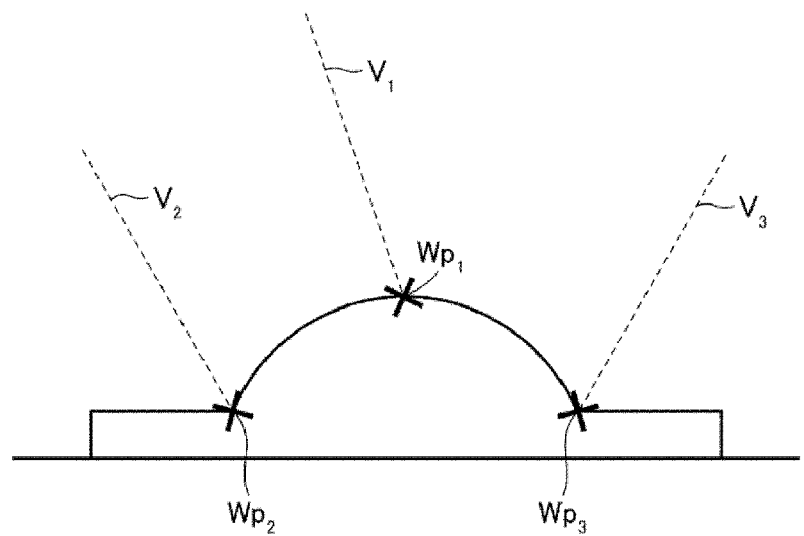
FIG. 18A, FIG. 18B and FIG. 18C are schematic diagrams illustrating modification examples of a reference line.
Figure 18B:
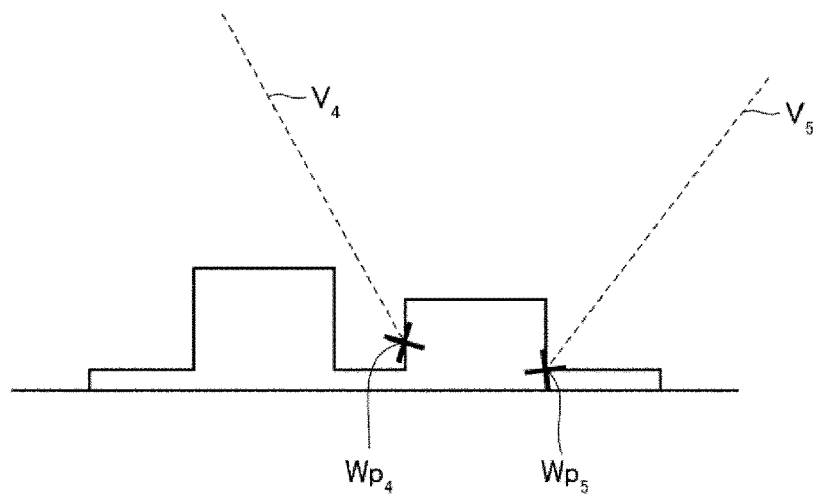
Figure 18C:
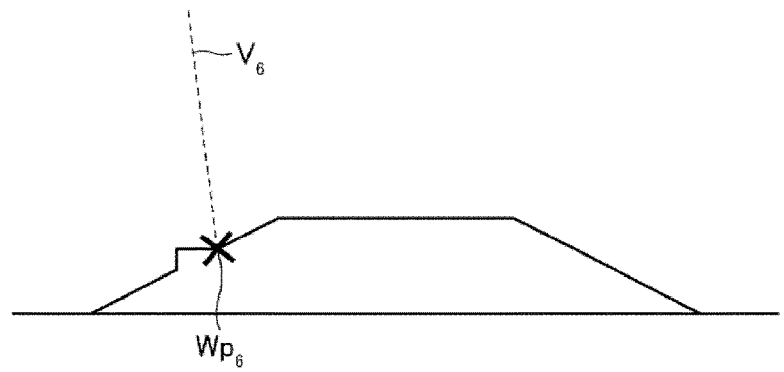

FIG. 18A, FIG. 18B and FIG. 18C are schematic diagrams illustrating modification examples of the reference line. For example, the reference line may be set based on the material of the workpiece W and the direction in which the irradiation light is incident. For example, in the case where the light for illumination is irradiated along the optical axis of the two-dimensional camera 310 and the material of the surface of the workpiece W is a specularly reflective material, the reference line $V_1$ in FIG. 18A is set to arrange the camera at a position where a specularly reflected light does not reach. Specifically, the reference line $V_1$ is a line passing through the measurement point $Wp_1$ and is set so that the perpendicular line is inclined. In this way, the two-dimensional camera 310 can be arranged in consideration of the direction of the light that is emitted to the measurement region including the measurement point $Wp_1$ and reflected from the measurement region.

In addition, the reference line may be set based on the shape of the surface of the workpiece W in the measurement region that includes the measurement point Wp. For example, in the case where the vicinity of the measurement points Wp (that is, the measurement point $Wp_2$, the measurement point $Wp_3$, the measurement point $Wp_5$, and the measurement point $Wp_6$) is composed of a plurality of surfaces, the reference line $V_2$ and the reference line $V_3$ in FIG. 18A, the reference line $V_5$ in FIG. 18B, and the reference line $V_6$ in FIG. 18C are respectively set so that each of the surfaces is covered by the imaging field of view of the two-dimensional camera 310. In this way, even if the workpiece W has a complex surface shape, the two-dimensional camera 310 can be arranged in consideration of the shape.

Furthermore, the reference line $V_4$ in FIG. 18B is set so as to include the region where the measurement point $Wp_4$ is set in the imaging field of view. Specifically, the reference line $V_5$ is set to avoid a concave/convex (that is, an obstacle) on the surface of the workpiece W. In this way, even if there is a concave/convex on the surface of the workpiece W, it is possible to prevent the vision from being blocked by the concave/convex in advance.

These reference lines may be calculated by the image processing device 2 in a series of processes when the inspection path WL is registered, as described with reference to FIG. 15, or may be set by the user with reference to the measurement point Wp. Moreover, after the reference lines are calculated by the image processing device 2, the user can make fine adjustment to the reference lines.

It should be considered that the embodiments disclosed this time are illustrative in all respects and are not restrictive. The scope of the disclosure is defined not by the above-described description but by the claims, and is intended to include all modifications within meanings and scope equivalent to the claims.

What is claimed is:

1. An image processing system for performing image measurement for one or a plurality of measurement points preset in a workpiece using an appearance image of the workpiece, the image processing system comprising:
a first imaging unit configured to capture the appearance image;
a robot that changes a relative positional relationship between the first imaging unit and the workpiece;
a first image processor configured to specify an arrangement situation of the workpiece based on information obtained by imaging the workpiece and specify a reference line with respect to each measurement point set in the workpiece according to the specified arrangement situation of the workpiece, wherein the reference line is set based on a material of the workpiece and a direction in which an irradiation light is incident;
a processor configured to position the first imaging unit on the specified reference line and give a command to the robot, wherein the robot moves the first imaging unit to a distance between the first imaging unit and the workpiece in a state in which an optical axis of the first imaging unit is matched with the specified reference line;
the first image processor configured to calculate a first feature amount regarding a degree of focusing of the first imaging unit based on the appearance image captured by the first imaging unit; and the processor configured to determine the distance between the first imaging unit and the workpiece for performing image measurement for the measurement point based on a change in the first feature amount according to a change in the distance between the first imaging unit and the workpiece.

2. The image processing system according to claim 1, further comprising:
   a second imaging unit that is arranged to include at least a portion of the workpiece and the robot in a range of a field of view and captures a three-dimensional image of a subject present within the range of the field of view;
   a memory configured to store information defining a reference line direction associated with each of the one or plurality of measurement points; and
   a second image processor configured to search for a portion matching shape information of the workpiece in the three-dimensional image; and
   configured to determine a reference line with respect to each measurement point based on information on the portion searched for by the second image processor and the information defining the reference line direction stored in the memory.

3. The image processing system according to claim 2, wherein the first image processor is configured to search for a portion matching a reference image of a corresponding measurement point for the image captured by the first imaging unit in a state in which the first imaging unit is positioned on the reference line determined by the reference line determination part; and
   configured to correct the reference line determined by the reference line determination part based on the information on the portion searched for by the first image processor.

4. The image processing system according to claim 1, wherein the processor is configured to give a command to the robot so that an angle between the specified reference line and the optical axis of the first imaging unit is changed from 0 to a predetermined value in a state in which the distance between the first imaging unit and the workpiece is maintained; and
   configured to determine a relative positional relationship between the first imaging unit and the workpiece for performing image measurement for the measurement point based on a change in the first feature amount according to the change in the angle.

5. The image processing system according to claim 1, wherein the first image processor is configured to calculate a second feature amount regarding a preset detection target portion based on the appearance image captured by the first imaging unit; and
   configured to determine presence or absence of the detection target portion at a measurement point serving as a target or near the measurement point based on the second feature amount calculated in a state in which the first imaging unit and the workpiece is positioned with a distance therebetween determined by the processor.

6. The image processing system according to claim 5, wherein the first image processor gives a command to the robot to position the first imaging unit at the next measurement point when determination of the presence or absence of the detection target portion performed by the processor is completed.

7. The image processing system according to claim 1, further comprising a measurement point setting reception part configured to display design information of the workpiece and set the one or plurality of measurement points with respect to the displayed design information.

8. The image processing system according to claim 7, further comprising a reference line calculation part configured to calculate a surface shape of each measurement point based on the design information of the workpiece for each of the measurement points set by the measurement point setting reception part.

9. The image processing system according to claim 2, wherein the processor is configured to give a command to the robot so that an angle between the specified reference line and the optical axis of the first imaging unit is changed from 0 to a predetermined value in a state in which the distance between the first imaging unit and the workpiece is maintained; and
   configured to determine a relative positional relationship between the first imaging unit and the workpiece for performing image measurement for the measurement point based on a change in the first feature amount according to the change in the angle.

10. The image processing system according to claim 3, wherein the processor is configured to give a command to the robot so that an angle between the specified reference line and the optical axis of the first imaging unit is changed from 0 to a predetermined value in a state in which the distance between the first imaging unit and the workpiece is maintained; and
    configured to determine a relative positional relationship between the first imaging unit and the workpiece for performing image measurement for the measurement point based on a change in the first feature amount according to the change in the angle.

11. The image processing system according to claim 2, wherein the first image processor is configured to calculate a second feature amount regarding a preset detection target portion based on the appearance image captured by the first imaging unit; and
    configured to determine presence or absence of the detection target portion at a measurement point serving as a target or near the measurement point based on the second feature amount calculated in a state in which the first imaging unit and the workpiece is positioned with a distance therebetween determined by the processor.

12. The image processing system according to claim 3, wherein the first image processor is configured to calculate a second feature amount regarding a preset detection target portion based on the appearance image captured by the first imaging unit; and
    configured to determine presence or absence of the detection target portion at a measurement point serving as a target or near the measurement point based on the second feature amount calculated in a state in which the first imaging unit and the workpiece is positioned with a distance therebetween determined by the processor.

13. The image processing system according to claim 4, wherein the first image processor is configured to calculate a second feature amount regarding a preset detection target portion based on the appearance image captured by the first imaging unit; and
    configured to determine presence or absence of the detection target portion at a measurement point serving as a target or near the measurement point based on the second feature amount calculated in a state in which the first imaging unit and the workpiece is positioned with a distance therebetween determined by the processor.

14. The image processing system according to claim 2, further comprising a measurement point setting reception part configured to display design information of the workpiece and set the one or plurality of measurement points with respect to the displayed design information.

15. The image processing system according to claim 3, further comprising a measurement point setting reception part configured to display design information of the workpiece and set the one or plurality of measurement points with respect to the displayed design information.

16. The image processing system according to claim 4, further comprising a measurement point setting reception part configured to display design information of the workpiece and set the one or plurality of measurement points with respect to the displayed design information.

17. The image processing system according to claim 5, further comprising a measurement point setting reception part configured to display design information of the workpiece and set the one or plurality of measurement points with respect to the displayed design information.

18. The image processing system according to claim 6, further comprising a measurement point setting reception part configured to display design information of the workpiece and set the one or plurality of measurement points with respect to the displayed design information.

19. An image processing device for performing image measurement for one or a plurality of measurement points preset in a workpiece using an appearance image of the workpiece, the image processing device comprising:
  a first interface that receives information on an appearance image from a first imaging unit that captures the appearance image;
  a second interface for communicating with a robot that changes a relative positional relationship between the workpiece and the first imaging unit;
  a first image processor configured to specify an arrangement situation of the workpiece based on information obtained by imaging the workpiece and specify a reference line with respect to each measurement point set in the workpiece according to the specified arrangement situation of the workpiece, wherein the reference line is set based on a material of the workpiece and a direction in which an irradiation light is incident;
  a processor configured to position the first imaging unit on the specified reference line and give a command to the robot, wherein the robot moves the first imaging unit to a distance between the first imaging unit and the workpiece in a state in which an optical axis of the first imaging unit is matched with the specified reference line;
  the first image processor configured to calculate a first feature amount regarding a degree of focusing of the first imaging unit based on the appearance image captured by the first imaging unit; and
  the processor configured to determine the distance between the first imaging unit and the workpiece for performing image measurement for the measurement point based on a change in the first feature amount according to a change in the distance between the first imaging unit and the workpiece.

20. A non-transitory computer-readable recording medium comprising an image processing program for performing image measurement for one or a plurality of measurement points preset in a workpiece using an appearance image of the workpiece, the image processing program causing a computer to execute:
  imaging the workpiece using a first imaging unit;
  specifying an arrangement situation of the workpiece based on information obtained by imaging the workpiece;
  specifying a reference line with respect to each measurement point set in the workpiece according to the specified arrangement situation of the workpiece, wherein the reference line is set based on a material of the workpiece and a direction in which an irradiation light is incident;
  positioning the first imaging unit on the specified reference line;
  giving a command to the robot that changes a relative positional relationship between the first imaging unit and the workpiece, wherein the robot moves the first imaging unit to a distance between the first imaging unit and the workpiece in a state in which an optical axis of the first imaging unit is matched with the specified reference line;
  calculating a first feature amount regarding a degree of focusing of the first imaging unit based on the appearance image captured by the first imaging unit; and
  determining the distance between the first imaging unit and the workpiece for performing image measurement for the measurement point based on a change in the first feature amount according to a change in the distance between the first imaging unit and the workpiece.

* * * * *